US012688257B2

(12) United States Patent
Powell

(10) Patent No.: US 12,688,257 B2
(45) Date of Patent: Jul. 21, 2026

(54) APPARATUS AND METHODS FOR DETERMINING COMPLEMENTARY DATA SETS

(71) Applicant: TES FRANCHISING, L.L.C., Southbury, CT (US)

(72) Inventor: Terry Powell, Southbury, CT (US)

(73) Assignee: TES FRANCHISING, L.L.C., Southbury, CT (US)

( * ) Notice: Subject to any disclaimer, the term of this patent is extended or adjusted under 35 U.S.C. 154(b) by 0 days.

(21) Appl. No.: 18/588,314

(22) Filed: Feb. 27, 2024

(65) Prior Publication Data

US 2025/0272358 A1 Aug. 28, 2025

(51) Int. Cl.
*G06F 18/22* (2023.01)
(52) U.S. Cl.
CPC .................................. *G06F 18/22* (2023.01)
(58) Field of Classification Search
CPC ...................................................... G06F 18/22
See application file for complete search history.

(56) References Cited

U.S. PATENT DOCUMENTS

| | | | |
|---|---|---|---|
| 10,776,758 B1 | 9/2020 | Benedict | |
| 11,983,228 B1 * | 5/2024 | Swope .................. | G06F 16/951 |
| 12,099,527 B1 * | 9/2024 | Smith ............... | G06F 16/24578 |
| 2006/0235714 A1 | 10/2006 | Adinolfi | |
| 2022/0114518 A1 | 4/2022 | Hishon-Rezaizadeh | |
| 2023/0187072 A1 * | 6/2023 | Neumann .............. | G16H 50/20 705/2 |
| 2024/0087068 A1 * | 3/2024 | Amar ................. | G06Q 50/2053 |

* cited by examiner

*Primary Examiner* — Aleksandr Kerzhner
*Assistant Examiner* — Samuel C Sharpless, III
(74) *Attorney, Agent, or Firm* — Caldwell LLC

(57) ABSTRACT

An apparatus for determining complementary data sets, the apparatus having a memory communicatively connected to a processor containing instructions to receive system data, wherein the system data includes user data and entity data, classify the system data to one or more descriptors, retrieve a plurality of advisor profiles, determine a complementary data set as a function of the system data and the plurality of advisor profiles, generate a user interface data structure wherein the user interface data structure includes at least the complementary data set and transmit the complementary data set to at least a remote device.

20 Claims, 8 Drawing Sheets

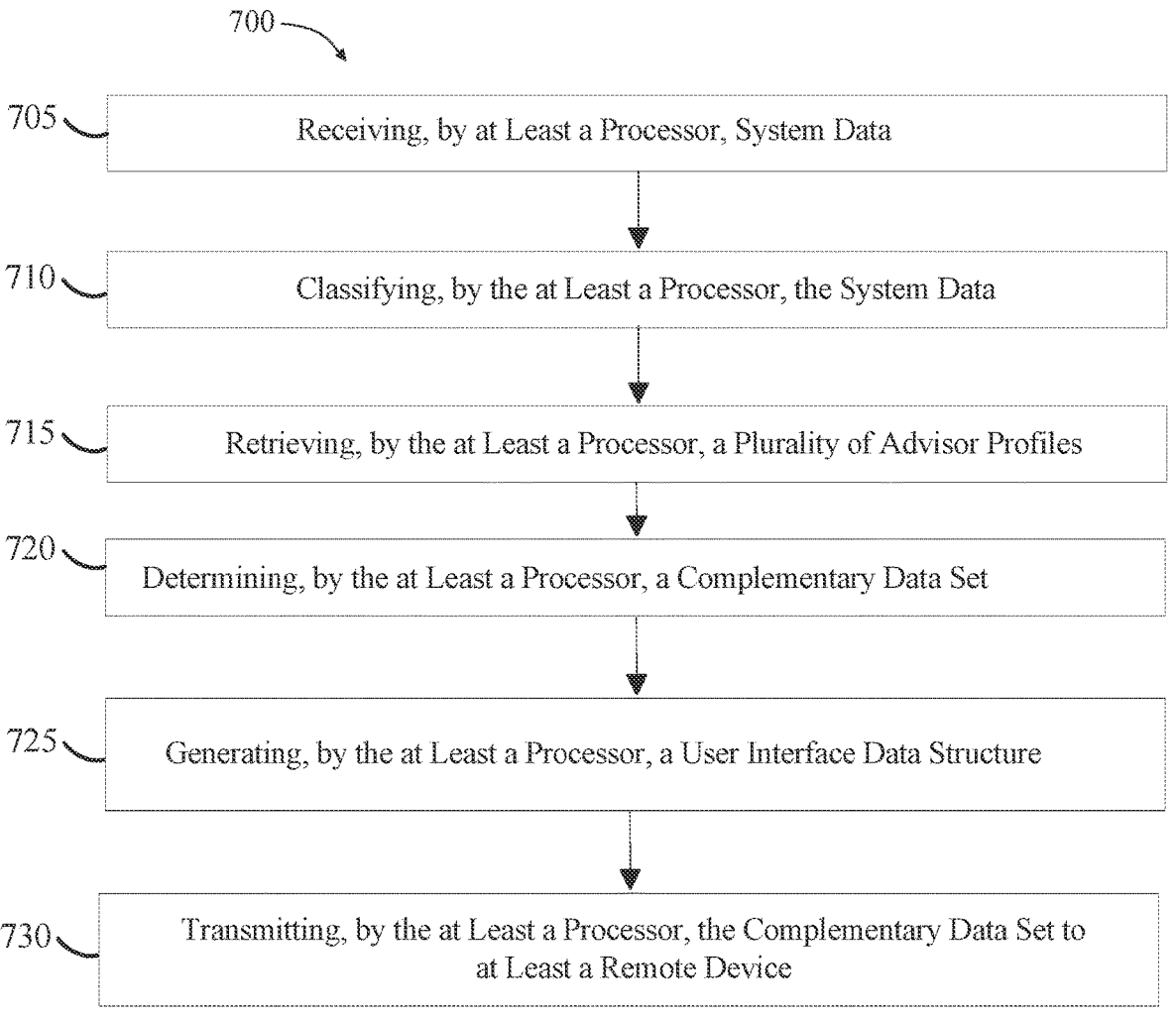

700

705   Receiving, by at Least a Processor, System Data

710   Classifying, by the at Least a Processor, the System Data

715   Retrieving, by the at Least a Processor, a Plurality of Advisor Profiles

720   Determining, by the at Least a Processor, a Complementary Data Set

725   Generating, by the at Least a Processor, a User Interface Data Structure

730   Transmitting, by the at Least a Processor, the Complementary Data Set to at Least a Remote Device

FIG. 7

APPARATUS AND METHODS FOR DETERMINING COMPLEMENTARY DATA SETS

FIELD OF THE INVENTION

The present invention generally relates to the field of machine learning. In particular, the present invention is directed to apparatuses and methods for determining complementary data sets.

BACKGROUND

Current systems utilized to determine complementary data sets are lacking due to the limited number of inputs and outputs that are used for matching. In addition, current systems that provide for a larger quantity of inputs and outputs lack the proper processes to ensure accurate matching of inputs and outputs.

SUMMARY OF THE DISCLOSURE

An apparatus for determining complementary data sets. The apparatus includes a memory communicatively connected to a processor. The memory contains instructions configuring the processor to receive system data, wherein the system data includes user data and entity data, classify the system data to one or more descriptors, retrieve a plurality of advisor profiles, determine aa complementary data set as a function of the system data and the plurality of advisor profiles, generate a user interface data structure wherein the user interface data structure includes at least the complementary data set, and transmit the complementary data set to at least a remote device.

A method for determining complementary data sets is described. The method includes receiving, by at least a processor, system data, wherein the system data includes user data and entity data. The method further includes classifying, by the at least a processor, the system data to one or more descriptors, retrieving, by the at least a processor, a plurality of advisor profiles, determining, by the at least a processor, a complementary data set as a function of the system data and the plurality of advisor profiles and generating, by the at least a processor, a user interface data structure wherein the user interface data structure includes at least the one or more complementary data sets. The method further includes transmitting, by the at least a processor, the complementary data set to at least a remote device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a flow diagram illustrating an exemplary embodiment of a method for determining the complementary data set in accordance with one or more embodiments of the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for determining complementary data sets. In one or more embodiments, apparatus includes a memory and a processor. In one or more embodiments, apparatus further includes a database, a chatbot system, and a web crawler. In one or more embodiments, apparatus may be configured to receive system data, retrieve advisor profiles, and determine one or more complementary data sets. In one or more embodiments, a franchise seeker may seek to acquire a particular franchise, wherein determination of complementary data sets may assist in the selection of potential franchises. In one or more embodiments, aspects of the present disclosure contain databases populated with potential franchises, chatbots configured to receive information from one or more individuals seeking to franchise, and advisors who are capable of aiding in the selection a franchise suitable for the franchise seeker.

Aspects of the present disclosure can be used to retrieve advisor profiles complementary data sets for determining one or more complementary data sets. For instance, and without limitation, aspects of the present disclosure can be used to assign an advisor who is capable of assisting an individual in the selection of a franchise. In one or more embodiments, apparatus is configured to generate information, such as a schedule, to guide a user in acquiring a franchise. Exemplary embodiments illustrating aspects of the present disclosure are described below in the context of several specific examples.

Figure 1:
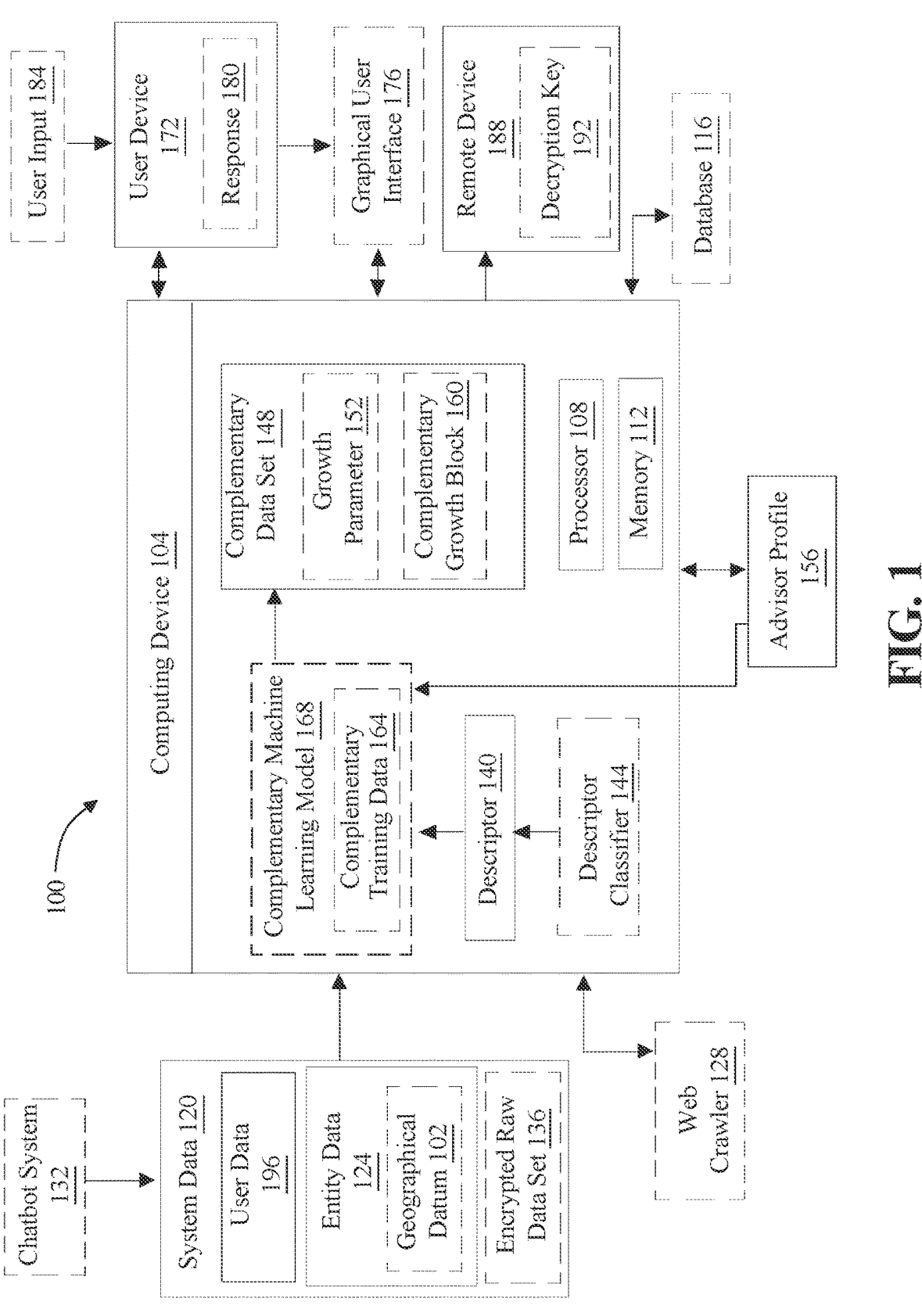
FIG. 1 is a block diagram of an exemplary embodiment of an apparatus for determining complementary data sets in accordance with one or more embodiments of the present disclosure.

Referring now to FIG. 1, an apparatus 100 for determining one or more complementary data sets is illustrated. Apparatus 100 includes a computing device 104. Apparatus 100 includes a processor 108. Processor 108 may include, without limitation, any processor described in this disclosure. Processor may be included in and/or be computing device 104. Computing device 104 may include any computing device or computing system (e.g., computing system

Figure 8:
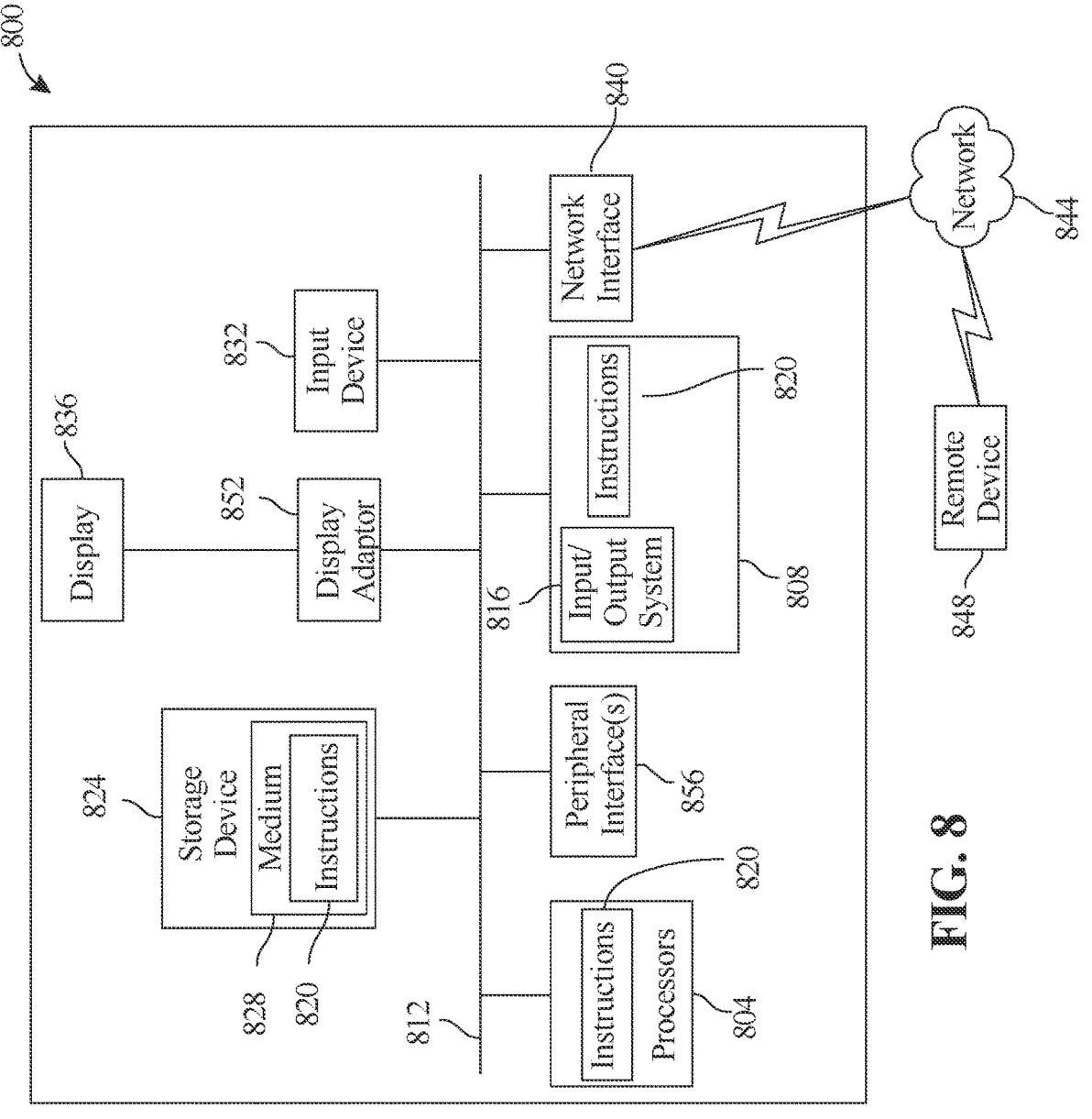
FIG. 8 is a block diagram of a computing system that can be used to implement any one or more of the methodologies disclosed herein and any one or more portions thereof.

800 shown in FIG. 8) as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include a database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database 116 may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 is configured to receive system data 120. "System data", for the purposes of this disclosure, is a collection of related information associated with a user and information associated with one or more entities. For example, system data 120 may include information associated with a user seeking to franchise one or more entities. In another non limiting example, system data 120 may include information of one or more entities that are capable of being franchised. In one or more embodiments, system data 120 may include user data 196. "User data", for the purposes of this disclosure, is information associated with a user. In one or more embodiments, user profile may be included in a user profile, which includes a compilation of data associated with a user. In a non-limiting embodiment, user profile may include user data relevant to a specified engagement that supports monetary goals or desired operations of a user. A "user", for the purposes of this disclosure, is an individual or a group of individuals seeking involvement in the operations of an entity. An entity may include an operation, such as a franchise. For example, and without limitation, a user may include an individual seeking a franchise (e.g., a potential franchisee). A "franchise", for the purposes of disclosure, is a business in which an owner licenses the owner's business operations, trademarks, intellectual property, and the like to one or more individuals seeking to operate a business under the name of the franchise in a particular location. For example, and without limitation, an owner of a burger restaurant may grant licensing to one or more individuals to open up another burger restaurant operating under the same name and standards. In one or more embodiments, a user may seek to "franchise" a business wherein the user may seek to acquire the proper licensing in order to open and operate the business at a separate location. In one or more embodiments, user data may include, but is not limited to, background information about a user, such as but not limited to, the name of the user, the age of the user, the geographical location of the user, and the like. In one or more embodiments, user data 196 may include financial information about the user. Financial information may include, but is not limited to, net worth, cash on hand, liquid assets, tangible assets, intangible assets, net income, gross income, short-term debt, long-term debt, taxes, and the like. In one or more embodiments, user data 196 may include a name, social security number, driver's license number, residency, nationality, age, height, contact information (e.g., telephone number or email address), employment history, education history, franchise ownership history, annual salary or income, and the like. In one or more embodiments, user data 196 may include a geographic location of the user. In one or more embodiments, the geographic location may include the place of residency of the user, the particular location in which a user is interested in operating a franchise, and the like. In one or more embodiments, user data 196 may further include a particular type of entity the user may be interested in purchasing and/or franchising. For example, system data and/or user data 196 may include a particular restaurant or a particular business that the user is interested in acquiring. In another non limiting example, user data 196 may include a particular entity associated with a franchise that user is interested in opening. In one or more embodiments, a particular user may be interested in operating, managing, and/or acquiring a particular business wherein user data 196 may include information associated with the business. In one or more embodiments user data 196 may include information about the type of franchise the user is seeking to obtain, operate and/or manage. In one or more embodiments, the particular type of franchise may include franchises such as, but not limited to, a job franchise, product franchise, distribution franchise, business format franchise, investment franchise, conversion franchise, and the like. In one or more embodiments, user data 196 may include a user profile. As used herein, a "user profile" is a compilation of data relevant to the specified object enablement which supports user's goals and operations. In a non-limiting embodiment, user profile may include data describing a plurality of franchises user aspires to open and run wherein the object enablement would refer to the franchise establishment. In some cases, user profile may include one or more data elements describing the type of franchise, investment requirements, property locations, resource needs, personnel and manning essentials, support, and any other topics and material which a successful franchisce may find helpful in the considerations around starting up a franchise. In a non-limiting example, user profile may include the goals of an aspiring software engineer, which may further include the coding platforms user hopes to learn to program within and the cost and materials affiliated with the accepted best path to gaining the expertise within the specified platforms. Additional disclosure on user profile may further be found in U.S. Non-provisional application Ser. No. 18/588,245, filed on Feb. 27, 2024, and entitled "APPARATUS AND METHODS FOR AUTOMATED MENTORSHIP USING MACHINE-LEARNING PROCESSES," the entirety of which is incorporated herein by reference.

Still referring to FIG. 1, apparatus 100 may receive entity data 124. Entity may be received from, for example, and without limitation, database 116. In one or more nonlimiting embodiments, entity data 124 may include a list of potential or available entities for operation and/or licensing. For instance, and without limitation, entity data may include a list of potential franchises. In one or more embodiments, system data 120 further includes entity data 124. "Entity data" for the purposes of this disclosure, is information about one or more entities. An "entity", for the purpose of this disclosure, is an organization with a distinct purpose. For example, and without limitation, entity may include one or more companies, such as a retail chain or a franchise. In one or more embodiments, the retail chain and/or franchise may contain multiple locations, wherein each location may be operated and/or managed by a differing individual. In one or more embodiments, entity data 124 may include information associated with a plurality of entities such as, for example, and without limitation, a list of retail chains and/or franchises. In one or more embodiments, entity data 124 May include data relating to a plurality of retail chains that are available for franchising. This may include particular entities that offer franchising opportunities such as licensing of a trademarked name, operating of a particular facility associated with the entity and the like. In one or more embodiments, entity data 124 may include basic information about one or more entities. For example, and without limitation, information related to an entity may include a collection of data files associated with a company, a collection of financial documents associated with the entity, cost of operation, location datum, revenue, growth, taxes, employee records, and the like. Financial documents may include, but are not limited to, gross income, taxation, tax returns, net income, net losses, and the like. Entity data 124 may further include employee records, such as but not limited to employee salaries or employee quantities. Entity data 124 may further include information associated with shareholders, number of facilities and/or chains owned and/or associated by the entity, the particular industry the entity is involved in (e.g., technology, baby products, nourishment, consumables, durable goods, healthcare, and the like) and the like. Entity data 124 may further include amount or type of equity owned by the entity, an amount of debt of the entity, manufacturing sites associated with and/or working on behalf of the entity (if any), cost of associated products or services, bill of materials, and the like. In one or more embodiments, entity data 124 may include information about one or more individuals associated with the entity. The individuals may include an employee associated within an entity, a shareholder, or any users associated with the entity. In one or more embodiments, entity data 124 may include forms and/or instruction on franchise opportunities. This may include forms necessary to operate a franchise, contact information associated with an individual who may manage franchising opportunities of the particular entity and the like. In some cases, entity data 124 may further include various requirements needed to open and/or operate a particular franchise. This may include but is not limited to, a particular amount of cash required for franchising, various forms required, and the like. In one or more embodiments, system data 120 and/or entity data 124 may further include information related to a particular individual associated with a particular entity. A particular individual may include an agent of the entity, an employee of the entity, and owner of the entity, and the like. In one or more embodiments, entity data 124 may further include a geographical datum 102. "Geographical datum", for the purposes of this disclosure, is information related to a location of an entity or aspects thereof. For example, and without limitation, geographical datum 102 may include a location of entity. In other embodiments, geographical datum 102 may include a primary location of the entity (e.g., headquarters) or state and/or country of incorporation. In one or more embodiments, geographical datum 102 may include a plurality of locations wherein each location may be associated with a corresponding franchise. For example, and without limitation, an entity may have rules and/or regulations that prohibit the operation of a particular franchise within a particular area. In one or more embodiments, geographical datum 102 may include the location of one or more facilities/or entities described within system data 120. In one or more embodiments, geographical datum 102 may include the location of one or more places in which the entity may be conducting business. For example, and without limitation, an entity may be located in two or more cities, two or more states, two or more countries, etc, wherein the entity may be conducting business at those locations. In one or more embodiments, geographical datum 102 may include the location of one or more properties and/or assets owned by the entity.

With continued reference to FIG. 1, in one or more embodiments, processor 108 may be configured to receive system data 120 as a function of user input. In one or more embodiments, a user may input system data 120 from a remote device or computing system so that the system data 120 may be stored in database 116 or memory 112. In one or more embodiments, system data 120 may include a data structure. In one or more embodiments, a user may input system data 120 using one or more input devices such as but not limited to an alpha-numeric input device (e.g., a keyboard), a pointing device, a joystick, a gamepad, an audio input device (e.g., a microphone, a voice response system, and the like), a cursor control device (e.g., a mouse), a touchpad, an optical scanner, a video capture device (e.g., a still camera or a video camera), a touchscreen, and/or any combinations thereof. In one or more embodiments, portion of system data 120 such as, for example, and without limitation, user data may be received as a function of user input wherein other portions may be retrieved from database 116 and/or any other method as described in this disclosure. In one or more embodiments, system data 120 and/or portions thereof may be retrieved from database 116. In one or more embodiments, database 116 may include a plurality of entities that are available for franchising wherein entity data 124 may include the plurality of entities available for franchising.

With continued reference to FIG. 1, in one or more embodiments, processor 108 may be configured to receive system data 120 using a web crawler 128. In one or more embodiments, processor 108 may be configured to receive entity data 124 using web crawler 128. A "web crawler," as used in this disclosure, is a program that systematically browses the internet for the purpose of web indexing. The web crawler 128 may be seeded with platform URLs, wherein the web crawler may then visit the next related, retrieve the content, index the content, and/or measures the relevance of the content to the topic of interest. In some embodiments, computing device 104 and/or processor 108 may generate web crawler 128 to compile system data 120 and/or elements thereof. Web crawler 128 may be seeded and/or trained with websites, such as business websites sites associated with a particular business within system data 120, regulatory body websites, industry trade groups, and the like to begin the search. Web crawler 128 may be generated by computing device 104. In some embodiments, web crawler 128 may be trained with information received from a user through a user interface. In some embodiments, the web crawler 128 may be configured to generate a web query. A web query may include search criteria received from a user. For example, and without limitation, a user may submit a plurality of websites for the web crawler 128 to search to extract any data suitable for system data. In one or more embodiments, processor 108 may receive one or more elements of system data 120 and feed those elements to WebCrawler to begin the search. For example, and without limitation, a user may enter the name of an entity wherein the WebCrawler may be configured to lookup information associated with the entity. In one or more embodiments, processor 108 may be configured to generate entity data 124 as a function of user data 196. In one or more embodiments, a user may be configured to input user data 196 wherein processor 108 may use user data 196 to retrieve one or more entities associated with user data 196. For example, and without limitation, processor 108 may be configured to retrieve entities within the same geographical location as indicated within user data 196. In another non limiting example, processor 108 may be configured to retrieve information about entities that are listed within user data 196. In one or more embodiments, processor may receive a particular type of franchising a user is interested in wherein processor may retrieve entity data 124 containing information about entities associated with such franchise opportunities. In one or more embodiments, processor 108 may configure web crawler to search for entities within a given geographical location as indicated by user data 196. In one or more embodiments, processor 108 may configure web crawler to retrieve information associated with entities listed within user data 196. In one or more embodiments, entity data 124 may be retrieved from database wherein entity data 124 may contain a plurality of entities and corresponding information.

In one or more embodiments, system data 120 may be received using a chatbot system 132. A "chatbot system", for the purposes of this disclosure, is a program configured to simulate human interaction with a user in order to receive or convey information. In one or more embodiments, chatbot system 132 may be configured to receive system data 120 and/or elements thereof through interactive questions or prompts presented to the user. For example, and without limitation, a question may include, but is not limited to, "What is your name?", "What is the name of your company?", "What is your geographic location?" and the like. In one or more embodiments, computing device 104 may be configured to present a comment box through a user interface wherein a user may interact with the chatbot and answer the questions through input into the chat box. In one or more embodiments, questions may require selection of one or more pre-configured answers. For example, and without limitation, chatbot system 132 may ask a user to select the appropriate salary range corresponding to a particular employee, wherein the user may select the appropriate range from a list of pre-configured answers. In situations where answers are limited to limited responses, chatbot may be configured to display checkboxes wherein a user may select a box that is most associated with their answer. For example, and without limitation, chatbot system 132 may inquire from a user the particular type of franchise the user is interested in wherein a user may select from one or more franchising options. In one or more embodiments, chatbot may be configured to receive system data 120 through an input. In one or more embodiments, each question may be assigned to a particular categorization wherein a response to the question may be assigned to the same categorization. For example, and without limitation, a question asking a user for the name of the entity may be categorized to a name categorization, and a question associated with employees of the entity may be categorized to an employee categorization. In one or more embodiments, categorizations may allow processor 108 to make calculations and determinations of elements within system data 120. In one or more embodiments, each categorization may contain its own unique calculations wherein processor 108 may be configured to make determinations and calculations based on each response.

With continued reference to FIG. 1, in one or more embodiments, system data 120 may further include at least one digital file. In one or more embodiments, system data 120 may include a plurality of digital files. Digital files may include, but are not limited to, scanned images, scanned documents, textual documents, financial documents, audio files, video files, image files, and the like. In one or more embodiments, processor 108 may convert digital file into a machine-encoded test using an optical character reader (OCR). For example, and without limitation, a user may input digital forms and/or scanned physical documents that have been converted to digital documents, wherein product data ser may include data that has been converted into machine readable text. In some embodiments, optical character recognition or optical character reader (OCR) includes automatic conversion of images of written (e.g., typed, handwritten, or printed text) into machine-encoded text. In one or more embodiments, recognition of at least a keyword from an image component may include one or more processes, including without limitation optical character recognition (OCR), optical word recognition, intelligent character recognition, intelligent word recognition, and the like. In one or more embodiments, OCR may recognize written text, one glyph or character at a time. In one or more embodiments, optical word recognition may recognize written text, one word at a time, for example, for languages that use a space as a word divider. In one or more embodiments, intelligent character recognition (ICR) may recognize written text one glyph or character at a time, for instance by employing machine learning processes. In one or more embodiments, intelligent word recognition (IWR) may recognize written text, one word at a time, for instance by employing machine learning processes.

Still referring to FIG. 1, in one or more embodiments, OCR may be an "offline" process, which analyses a static document or image frame. In one or more embodiments, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In one or more embodiments, this technology may be referred to as "online" character recognition, dynamic character recognition, real-time character recognition, and intelligent character recognition.

Still referring to FIG. 1, in one or more embodiments, OCR processes may employ pre-processing of image components. Pre-processing process may include without limitation de-skew, de-speckle, binarization, line removal, layout analysis or "zoning," line and word detection, script recognition, character isolation or "segmentation," and normalization. In one or more embodiments, a de-skew process may include applying a transform (e.g., homography or affine transform) to the image component to align text. In one or more embodiments, a de-speckle process may include removing positive and negative spots and/or smoothing edges. In one or more embodiments, a binarization process may include converting an image from color or greyscale to black-and-white (i.e. a binary image). Binarization may be performed as a simple way of separating text (or any other desired image component) from the background of the image component. In one or more embodiments, binarization may be required for example if an employed OCR algorithm only works on binary images. In one or more embodiments, a line removal process may include the removal of non-glyph or non-character imagery (e.g., boxes and lines). In one or more embodiments, a layout analysis or "zoning" process may identify columns, paragraphs, captions, and the like as distinct blocks. In one or more embodiments, a line and word detection process may establish a baseline for word and character shapes and separate words, if necessary. In one or more embodiments, a script recognition process may, for example in multilingual documents, identify a script allowing an appropriate OCR algorithm to be selected. In one or more embodiments, a character isolation or "segmentation" process may separate signal characters, for example, and without limitation, character-based OCR algorithms. In one or more embodiments, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In one or more embodiments, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In one or more embodiments, feature extraction may decompose a glyph into features. Exemplary non-limiting features may include corners, edges, lines, closed loops, line direction, line intersections, and the like. In one or more embodiments, feature extraction may reduce dimensionality of representation and may make the recognition process computationally more efficient. In one or more embodiments, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 4-6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in one or more embodiments, OCR may employ a two-pass approach to character recognition. The second pass may include adaptive recognition and use letter shapes recognized with high confidence on a first pass to recognize better remaining letters on the second pass. In one or more embodiments, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In one or more embodiments, OCR software may employ neural networks, for example neural networks as taught in reference to FIGS. 4, 5, and 6.

Still referring to FIG. 1, in one or more embodiments, OCR may include post-processing. For example, and without limitation, OCR accuracy can be increased, in one or more embodiments, if output is constrained by a lexicon. A lexicon may include a list or set of words that are allowed to occur in a document. In one or more embodiments, a lexicon may include, for instance, all the words in the English language, or a more technical lexicon for a specific field. In one or more embodiments, an output stream may be a plain text stream or file of characters. In one or more embodiments, an OCR process may preserve an original layout of visual verbal content. In one or more embodiments, near-neighbor analysis can make use of co-occurrence frequencies to correct errors, by noting that certain words are often seen together. For example, and without limitation, "Washington, D.C." is generally far more common in English than "Washington DOC." In one or more embodiments, an OCR process may make use of a priori knowledge of grammar for a language being recognized. For example, and without limitation, grammar rules may be used to help determine if a word is likely to be a verb or a noun. Distance conceptualization may be employed for recognition and classification. For example, and without limitation, a Levenshtein distance algorithm may be used in OCR post-processing to further optimize results.

With continued reference to FIG. 1, processor 108 may be configured to encrypt system data 120, wherein encryption of system data 120 results in the generation of encrypted system data 136. Encryption may include any encryption process as described above. In one or more embodiments, system data 120 may include confidential information that requires protection. In one or more embodiments, system data 120 may require encryption wherein access to system data 120 may only be given to authorized individuals. In one or more embodiments, access to system data 120 without the proper decryption key may result in the viewing of cyphertext, wherein an individual may not understand the contents of system data 120. In one or more embodiments, system data 120 may be encrypted using an encryption key wherein the encryption key is configured to modify plain text within system data 120 into cypher text. In one or mor embodiments, a decryption key may be required to convert system data 120 from cyphertext back into plain text. In one or more embodiments, processor 108 may be configured to encrypt system data 120 and store system data 120 on database 116. In one or more embodiments, individuals associated with apparatus 100 may not be authorized to view the contents of system data 120 until a decryption key is provided.

Still referring to FIG. 1, in one or more embodiments, methods and apparatus described in this disclosure may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, apparatus and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," and "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, and without limitation, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, processor 108 is configured to classify system data 120 to one or more descriptors 140. "Descriptor" for the purposes of this disclosure is a label used to categorize one or more elements within system data 120, where each label or categorization of elements may be used to make one or more determinations. For example, and without limitation, a particular descriptor 140 may include a grouping of elements such as elements describing financial information, where processor 108 may be configured to make one or more determinations using the grouping of elements describing financial information. In one or more embodiments, descriptors 140 may include categorizations such as, the particular industry associated with system data 120 and/or alternatively the particular industry associated with user data 196. The particular industry may include industries such as, but not limited to, retail, clothing, groceries, technologies, fast food, real estate, and the like. Descriptors 140 may further include particular product categorizations. This may include, but is not limited to, product categorizations such as electronic products, baby products, fast food products, and the like. In one or more embodiments, the presence of a particular descriptor 140 within system data 120 may be used for one or more determinations. For example, and without limitation, a particular descriptor 140 stating "technology" may indicate that a particular system data 120 contains information about an entity that is involved in the technology sector. In an embodiment, each descriptor 140 may be used for a particular function. For example, and without limitation, a first descriptor 140 may be used to find a corresponding set of matches in connection with system data 120 and/or user data 196, and a second descriptor 140 may be used to narrow the match. In one or more embodiments, descriptors 140 may be used to match up user data 196 to one or more entities within entity data 124. In one or more embodiments, descriptors 140 may be used to organize system data 120 wherein similar elements may be viewed in conjunction with one another. For example, and without limitation, an individual viewing system data 120 may view the plurality of elements within system data 120, wherein the plurality of elements are categorized to each particular descriptor 140. In one or more embodiments, descriptors 140 may be used to properly sort data for viewing. In one or more embodiments, system data 120 may contain a large volume of data wherein descriptors 140 may allow for the sorting of the data. In one or more embodiments, descriptors 140 may be used to remove duplicate data that are associated with a particular descriptor 140. For example, and without limitation, user data 196 may contain redundant information, wherein processor 108 may first classify elements to one or more descriptors 140. In one or more embodiments, processor 108 may receive one or more descriptors 140 that have been classified to elements within system data 120 and use the descriptors 140 for further processing as described below. In one or more embodiments, descriptors 140 may be used to match up a user to one or more entities. In one or more embodiments, processor 108 may be configured to classify system data to one or more categorizations, wherein each categorization may indicate a potential match with a particular entity. For example, and without limitation, a particular entity within entity data 124 may be classified to a particular descriptor wherein elements of user data 196 may be classified to the same descriptor. In an embodiment, the presence of elements of user data 196 and entity data 124 within the same descriptor categorization may indicate a potential match between a user and a potential entity to be used for franchising.

With continued reference to FIG. 1, system data 120 may be classified to one or more descriptors 140 through the use of chatbot system 132. For example, and without limitation, each question asked by chatbot system 132 may be associated with a particular descriptor 140, where each input may be associated to a corresponding descriptor 140. In one or more embodiments, user may be configured to provide a digital sheet having a plurality of rows and columns wherein each row or column may be associated with a particular descriptor 140. In one or more embodiments, processor 108 may be configured to receive the digital sheet and categorize each column, wherein each column is representative of a particular descriptor 140. In one or more embodiments, processor 108 may be configured to retrieve a plurality of keywords from a database 116, where one or more keywords may be associated to a particular descriptor 140. "Keyword" for the purposes of this disclosure is a word that is informative of a particular set of information. For example, and without limitation, keyword may include "battery" wherein the presence of the word "battery" may indicate system data 120 includes information about a product having batteries. Similarly, a word such as "salary" may indicate that the following information may be associated with employee salaries. In one or more embodiments, each descriptor 140 may contain one or more keywords wherein the presence of a particular keyword may indicate that a classification of a particular element within system data 120 to a particular descriptor 140.

With continued reference to FIG. 1, processor 108 may be configured to classify system data 120 to one or more descriptors 140 using a descriptor classifier 144. "Descriptor classifier", for the purposes of this disclosure, is a classifier that is configured to categorize one or more elements within system data 120 to one or more descriptors 140. A "classifier," as used in this disclosure, is a machine-learning model, such as a mathematical model, neural net, or program generated by a machine-learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. In one or more embodiments, processor 108 may generate and train a descriptor classifier 144 configured to receive system data 120 and output one or more descriptors 140. Processor 108 and/or another device may generate a classifier using a classification algorithm, defined as a process whereby a computing device 104 derives a classifier from training data. In one or more embodiments descriptor classifier 144 may classify system data 120 and/or elements thereof to one or more descriptors 140. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Descriptor classifier 144 may be trained with training data correlating elements of system data inputs to one or more descriptor outputs. In an embodiment, training data may be used to show that system data 120 may be correlated to a specific descriptor. Training data may be received from an external computing device 104, input by a user, and/or previous iterations of processing. Descriptor classifier 144 may be configured to receive as input and categorize components of system data 120 to one or more descriptors 140. In one or more embodiments, processor 108 and/or computing device 104 may then select any elements of system data 120 containing a similar label and/or grouping and group them together. In one or more embodiments, system data 120 may be classified using a classifier machine learning model. In one or more embodiments classifier machine learning model may be trained using training data correlating a plurality of system data 120 and/or elements thereof to a plurality of descriptors 140. In an embodiment, an element of system data 120 may be correlated to a corresponding descriptor 140 using descriptor classifier. In one or more embodiments, classifying system data 120 may include classifying system data 120 as a function of the classifier machine learning model. In one or more embodiments classifier training data may be generated through input by a user. In one or more embodiments, classifier machine learning model may be trained through user feedback wherein a user may indicate whether a particular element corresponds to a particular descriptor 140. In one or more embodiments, classifier machine-learning model may be trained using inputs and outputs based on previous iterations. In one or more embodiments, a user may input previous system data 120 and corresponding descriptor 140 wherein classifier machine learning model may be trained based on the input.

With continued reference to FIG. 1, computing device 104 and/or processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 116, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors' algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as $[5, 10, 15]$ may be treated as equivalent, for purposes of this disclosure, as a vector represented as $[1, 2, 3]$. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure, may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, processor 108 is configured to retrieve a plurality of advisor profiles 156. "Advisor profile", for the purposes of this disclosure, is information associated with a professional or advisor. An "advisor" is an individual specializing in the selection and operation of entities. For example, and without limitation, advisor profile 156 may include a financial advisor who holds themselves out as one who can assist in the franchising of a particular chain. A financial advisor may include, but is not limited to, an accountant, an individual with licensing and/or credentials verifying the advisor is well versed in one or more areas, an individual who holds themselves out as being well versed in a type of finance, and the like. In one or more embodiments, advisor profile 156 may include information such as, but not limited to, basic information about the financial advisor. This may include, but is not limited to, name, age, the geographical location the advisor resides in, various licensing and credentials associated with the advisor's ability to assist in franchising, and the like. In one or more embodiments, advisor profile 156 may include information regarding assistance of previous franchising opportunities if any. For example, and without limitation, advisor profile 156 may include information indicating that a particular financial advisor assisted in 20 franchising opportunities within a particular industry in the previous year. In one or more embodiments, advisor profile 156 may include information about a particular industry with which the advisor is familiar. For example, and without limitation, advisor profile 156 may include information related to the advisor's qualifications and level of expertise in franchising industries such as, food, products, technology, retail, and the like. For example, and without limitation, an advisor profile may include educational history, work history, certification, references, and the like. In one or more embodiments, each advisor profile 156 may contain one or more descriptors 140 wherein the presence of a descriptor 140 may indicate that the advisor holds themselves out as having the requisite knowledge of one or more descriptors 140. For example, the presence of descriptor associated with retail franchises may indicate that the advisor associated with advisor profile specializes in retail franchising. The requisite knowledge may include, but is not limited to, previous franchising experience in the field, an understanding of the rules and regulations within the field, an understanding of various businesses operating in the field and the like.

With continued reference to FIG. 1, advisor profile 156 may include may additionally include information of a human employed or affiliated by a third-party organization. As used herein, a "third party organization" is the overseeing entity who offers the services of apparatus 100 and provides the proprietary training information that may be used within the platform. The coach, or advisor, may engage directly with user, or through a user interface of apparatus 100. Additional information about coaches may be found in U.S.

Non-provisional application Ser. No. 18/588,130, filed on Feb. 27, 2024, and entitled "APPARATUS AND METHOD FOR GENERATING A COACHING DEVELOPMENT WITHIN A COACHING PROCESS," and in U.S. Non-provisional application Ser. No. 18/588,245, filed on Feb. 27, 2024, and entitled "APPARATUS AND METHODS FOR AUTOMATED MENTORSHIP USING MACHINE-LEARNING PROCESSES," the entirety of which are incorporated herein by reference.

Still referring to FIG. 1, in one or more embodiments, advisor profile 156 may include a rating of advisor. The rating may include a measurement of the one or more capabilities of the advisor. For example, and without limitation, a rating may include a "3" out of "5" wherein the 3 out of 5 may indicate the financial advisor is of "average" skill level in an area of expertise. In one or more embodiments, advisor profile 156 may include multiple ratings wherein each rating may be associated with a particular set of information, such as a skill set, within advisor profile 156. For example, and without limitation, advisor profile 156 may include one or more descriptors wherein each descriptor contains a rating, wherein the rating may be used to determine the advisor's knowledge within one or more areas of expertise. In one or more embodiments, ratings may be inputted by an advisor. In one or more embodiments, the ratings may be input by one or more third parties, such as other advisors or customers. In one or more embodiments, advisor profile 156 may be generated based on user input, where one or more customers may input a rating for advisor profile 156. In one or more embodiments, the customers may include individuals who have previously worked and/or conversed with an advisor associated with advisor profile 156. In one or more embodiments, rating may include an average, median and/or any other calculation that may be used to describe the competency and/or the knowledge of the advisor. In one or more embodiments, advisor profile 156 may include one or more descriptions wherein the presence of a particular descriptor indicates that the advisor is knowledge with respect to the particular categorization. For example, and without limitation, advisor profile 156 may include a descriptor 140 such as "food" wherein the presence of the descriptor 140 within advisor profile 156 will put others on notice that that advisor holds themselves out as being proficient within the particular descriptor. In one or more embodiments, advisor profile 156 may include more than one descriptor 140 wherein the advisor may be proficient in more than one area. In one or more embodiments, advisor profile 156 may be retrieved from database 116. In one or more embodiments, advisor profile 156 may be generated using web crawler 1288 wherein web crawler 128 may be configured to retrieve a plurality of advisor profiles 156 and update database 116. Advisor profile 156 is discussed in further detail below.

With continued reference to FIG. 1, processor 108 is configured to determine one or more complementary data sets 148 as a function of at least system data 120. A "complementary data set" is a data set containing information about a user and a corresponding match of data associated with the user data 196. For example, complementary data set 148 may include one or more advisor profiles 156 that may be used to complement user data 196 and/or system data 120. For example, and without limitation, complementary data set 148 may include advisors who are located within a particular geographic location as user and/or advisors who contain the requisite expertise to assist user in finding and franchising an entity. In one or more embodiments, processor 108 may be configured to determine a complementary data set 148. In one or more embodiments, the complementary data set 148 includes an advisor profile 156 matched to a user and/or system data. In other embodiments, one or more complementary data sets 148 may include a single advisor profile 156. In one or more embodiments, complementary data set 148 includes an advisor profile 156 that is matched to the user based on system data 120. For example, and without limitation, a user may seek to franchise an entity and seek out assistance on franchising, such as choosing a franchise and running the franchise. As a result, processor 108 may receive system data and determine and/or select an advisor that can assist with the user's request as indicated within system data 120. In one or more embodiments, complementary data set 148 may include an advisor and/or advisor profile that contains the requisite experience to assist a user in franchising of an entity. In one or more embodiments, complementary data set 148 may include information associated with an advisor and/or advisor profile wherein complementary data set 148 may include a corresponding match to system data 120. In one or more embodiments, complementary data set 148 may include a corresponding match wherein the advisor may be capable of assisting the individual with franchising of a particular entity as indicated by system data. In one or more embodiments, complementary data set 148 may include advisor profiles 156 that have the requisite experience to assist user on franchising as indicated by user data 196. Additionally or alternatively, in one or more embodiments, complementary data set 148 may further include information associated with entities that may complement system data 120 and/or user data 196. For example, and without limitation, complementary data set 148 may include entities that have been determined to be best suited for the user with respect to franchising. In another non limiting example, complementary data set 148 may include information about a particular user and one or more entities that the user is capable of franchising. In one or more embodiments, the one or more entities within complementary data set may include entities that are available for franchising opportunities. In one or more embodiments, complementary data set 148 may further include one or more advisor profiles 156, wherein the one or more advisor profiles 156 include financial advisors who are knowledge and/or capable of one or more franchising opportunities within a particular complementary data set 148. In one or more embodiments, each complementary data set 148 may include a particular advisor profile 156. In one or more embodiments, each complementary data set 148 may include a singular entity that is available for franchising. In one or more embodiments, a plurality of complementary data sets 148 may include a plurality of entities that are available for franchising. In one or more embodiments, each complementary data set 148 may further include growth parameters (as described below). In one or more embodiments, complementary data set may include information associated with the particular categorizations that entity data 124 and user data 196 have been classified to. For example, and without limitation, complementary data sets 148 may include information about a particular industry, various governmental regulations about the industry, instructions on how to create a corporation, instructions on the particular type of corporation sought to be created (e.g., S-Corp, publicly held company, LLC, and the like), information about how to go about developing a particular franchise, information indicating how to increase production of a product, information indicating how to reduce costs, information indicating various software that may assist with growth of the entity, information about various individuals who may assist with the growth of the entity, and the like.

With continued reference to FIG. 1, complementary data sets 148 may include advisor profiles and a corresponding degree of match. For example, and without limitation, complementary data set may include advisor profile 156 and a numerical element such as "50%", wherein the numerical element may indicate that the degree of match between user data 196 and complementary data set is 50%. In one or more embodiments, degree of match may be quantified in numerical elements, such as, but not limited to, numbers, percentages, fractions and the like wherein the numerical elements may be used to indicate a corresponding degree of match between user data 196 and complementary data set. In one or more embodiments, degree of match may be quantified in the amount of descriptors that user data and complementary data set share. For example, user data 196 and a first complementary data set may have four descriptors in common whereas a second complementary data set may have three descriptors in common with user data. In one or more embodiments, the presence of more descriptors within degree of match may indicate a higher degree of match between complementary data set 148 and user data 196. In one or more embodiments, degree of match may be used to indicate how qualified an advisor within advisor profile 156 is in comparison to user data 196. In one or more embodiments, complementary data set 148 may include advisor profile 156 and corresponding degree of match between advisor profile and user data 196.

With continued reference to FIG. 1, in one or more embodiments, complementary data set 148 may further include growth parameters 152. Additionally or alternatively, in one or more embodiments, processor may be configured to generate one or more growth parameters as a function of complementary data set, entity data 124 and/or system data 120. Additionally or alternatively, growth parameters may be generated as a function of user input 184 as described herein. "Growth parameters", for the purposes of this disclosure, are attributes of characteristics related to the growth of an entity. For example, and without limitation, growth parameters may include information such as the cost of land or the cost of renting a facility within a particular geographic area wherein the cost of land or the cost to rent may be indicative of how well the franchise may operate. Continuing, a high cost of land or a high cost of rent may tend to indicate that the franchise may not be profitable within a given area. In one or more embodiments, growth parameters 152 may include various funding sources and options, such as information regarding various funding partners which may occur at the beginning of this process and provide the user with a comprehensive view of financial options and strategic partnerships. Early introduction to funding partners may allow the user to consider financial strategies and resources from the start, aligning financial planning with personal development goals. In one or more embodiments, growth parameters 152 may include market research within the industry of the entity (e.g., trends related to purchasing, trends that may affect growth and the like), research about competitors within the same industry, research of competitors within same geographical location, qualifications for franchising (if desired), risks associated with franchising, growth strategies based on the cash at hand, various funding sources (e.g., banks that may provide funding and at what rate), various employee training courses suitable for growth, research based on foot traffic within one or more geographical areas and the like. In one or more embodiments, growth parameters 152 may indicate various factors that may be determinative of the growth of one or more entities that are available for franchising. For example, and without limitation, a growth parameter 152 containing information about market research may indicate that demand for a particular product is down and as a result, growth of the entity may be affected. In one or more embodiments, growth parameters may be generated as a function of a growth machine learning model. In one or more embodiments, growth machine learning model may be configured to receive inputs such as complementary data set, entity data, system data and the like and produce outputs such as growth parameters. In one or more embodiments, growth machine learning model may be trained by growth training data having a plurality of inputs (as described above) correlated to a plurality of growth parameters. In one or more embodiments, growth training data may be used to train growth machine learning model. In one or more embodiments, growth parameters may be generated as a function of growth machine learning model. In one or more embodiments, growth training data may be generated by one or more advisors, users, previous iterations of the processing, a third party and the like. In one or more embodiments, growth training data may be generated using web crawler 128, wherein web crawler 128 is configured to receive inputs and correlated outputs. In one or more embodiments, processor 108 may be configured to modify growth training data as a function of input. For example, and without limitation, an input may be made through a user interface (as described below), wherein inputs may be used to modify train data and update growth machine learning model. In one or more embodiments, processor 108 may be configured to classify inputs and outputs of growth training data to descriptors wherein inputs and outputs are classified to the same descriptors. In one or more embodiments, classification may allow for multiple sets of growth training data wherein each set is classified to a particular descriptor. In an embodiment, classification may allow for quicker processing wherein a particular training data is chosen based on the classification of the input. In one or more embodiments, growth machine learning model may be iteratively trained based on input wherein feedback is given on each output generated by growth machine learning model. In an embodiment, feedback may provide for more accurate results and error correction in outputs.

In one or more embodiments, complementary data set 148 may be determined as a function of system data 120 and a plurality of advisor profiles 156. In an embodiment, each complementary data 148 may include entities within entity data 124 that have been categorized to one or more similar descriptors as user data 196. In an embodiment, each complementary data set 148 may contain entities within entity data 124 that have been categorized to a particular descriptor as well as user data 196 that have been categorized to the same descriptor. In one or more embodiments, each complementary data set may further include information about the entity wherein a user may be given descriptive information (such as any information described within entity data 124 above) about the entity. In one or more embodiments, complementary data set 148 may include one or more advisor profiles 156 that have been selected and/or determined to be able to assist the user.

With continued reference to FIG. 1, in one or more embodiments, complementary data set 148 may include new or updated information in order to ensure proper and accurate matching of new and relevant information. In one or more embodiments, complementary data set 148 and/or elements thereof may be determined using web crawler 128.

In an embodiment, web crawler 128 may be configured to receive one or more descriptors 140 wherein each descriptor 140 may be associated with a particular seed (wherein a seed represents an initial URL). In one or more embodiments, web crawler 128 may be configured to parse through one or more websites associated with the particular descriptor 140 wherein complementary data set 148 may receive updated information. In one or more embodiments, a particular descriptor 140 may be associated with government regulation websites, whereas another descriptor 140 may be associated with market research within a particular industry. In one or more embodiments, processor 108 may be configured to receive one or more descriptors 140 wherein each descriptor 140 may be used to populate complementary data set 148. In one or more embodiments, a plurality of complementary data sets 148 may be located on database 116 wherein Web crawler 128 may be configured to modify and/or update the complementary data sets 148 using web crawler 128. For example, and without limitation, a particular complementary data set 148 containing tax codes and/or governmental regulations may be continuously and/or periodically updated in order to reflect the most recent tax codes and governmental regulations.

With continued reference to FIG. 1, complementary data set 148 may further include information associated with one or more advisor profiles 156. In one or more embodiments, complementary data sets may be determined as a function of the advisor profiles 156 and user data 196 wherein processor may retrieve advisor profiles 156 and determine complementary data sets containing one or more advisor profiles. In one or more embodiments, each complementary data set 148 may include one or more advisor profiles 156. In one or more embodiments, each complementary data set 148 may include a particular advisor profile 156 that is correlated to the complementary data set such as by containing similar descriptors 140 with the complementary data sct 148.

With continued reference to FIG. 1, one or more complementary data sets 148 may be determined using a plurality of growth blocks 160. "Growth block", for the purposes of this disclosure, is a particular set of information relating to franchising or operating of an entity. For example, and without limitation, a first growth block 160 may include information about franchising, whereas a second growth block 160 may include information about market research. In an embodiment, the first and second growth blocks 160 may be independent from one another, wherein the first growth block 160 may contain the requisite information necessary for franchising and the second growth block 160 may contain requisite information necessary of market research. In one or more embodiments, complementary data set 148 may include and/or be composed of one or more growth blocks 160. In an embodiment, each growth block 160 may address a particular need or complement a particular portion of system data 120. In one or more embodiments, database 116 may be populated with a plurality of growth blocks 160 wherein processor 108 may be configured to retrieve and/or select one or more growth blocks 160 to be used in complementary data set 148. In one or more embodiments, one or more growth blocks 160 may be generated using a web crawler 128, wherein the web crawler 128 may be configured to generate particular growth blocks 160 relating to particular categories of data. In one or more embodiments, an individual such as a financial advisor, a financial coach, an attorney, and the like, may generate one or more growth blocks 160. In one or more embodiments, an individual may label each growth block 160 with one or more descriptors 140. In one or more embodiments, each growth block 160 may be associated with a particular descriptor 140, wherein the classification of a particular descriptor 140 may indicate the selection of a particular growth block. In one or more embodiments, each growth block 160 may be associated with a particular advisor profile 156 and/or corresponding information about the advisor profile 156. In one or more embodiments, each advisor profile 156 may be associated with one or more descriptors 140 wherein association may indicate a particular knowledge or expertise associated with the descriptor 140. In an embodiment, growth blocks 160 may include any information within complementary data set 148. In one or more embodiments, processor 108 may be configured to receive a plurality of growth blocks 160 and select one of the pluralities of growth blocks 160. In one or more embodiments, processor 108 may be configured to determine a plurality of complementary data sets 148 wherein each complementary data set 148 may include one or more growth blocks 160. In one or more embodiments, processor 108 may populate each complementary data set 148 with one growth block 160 associated with each descriptor 140. In an embodiment, each descriptor 140 may be associated with more than one growth blocks 160 wherein each determined complementary data set 148 may include one growth block 160 associated with each descriptor 140. In an embodiment, processor 108 may be configured to generate a configuration of a plurality of complementary data sets 148 wherein each complementary data set 148 may include one growth block 160 from each descriptor 140. As a non-limiting example, system data 120 may be classified to two descriptors 140 (represented as "A" and "B" for illustrative purposes) wherein each descriptor 140 may be associated with two growth blocks 160 (represented as "1" and "2" for illustrative purposes). As a result a first complementary data set 148 (represented as a combination of A1 and B1) may include a first growth block 160 associated with the first descriptor 140 (represented as A1) and a first growth block 160 associated with a second descriptor 140 (represented as B1).

Continuing, A second complementary data set 148 (represented as "A2" and "B1") and may include a second growth block 160 from the first descriptor 140 (represented as "A2") and a first growth block 160 form the second descriptor 140 (represented as "B1") wherein a total of four complementary data sets 148 may be determined. In one or more embodiments, processor 108 may be configured to generate a plurality of growth blocks 160 wherein the number of growth blocks 160 generated may be dependent on the descriptors 140 and the associated growth blocks 160.

Still referring to FIG. 1, in one or more embodiments, complementary data set 148 may further be determined through input wherein an individual, such as any individual as described in this disclosure, may determine one or more complementary data sets 148. In one or more embodiments, complementary data sets 148 may include complementary data sets 148 determined on previous iterations of the processing and updated to database 116. In one or more embodiments, additional growth blocks 160 may be added by an individual to a particular complementary data set 148 following a processing of the complementary data sets 148 wherein processor 108 may be configured to receive the additional growth block 160 and update database 116.

Still referring to FIG. 1, in one or more embodiments, complementary data set 148 may further be determined as a function of geographical datum 102. In an embodiment, each complementary data set 148 and/or elements thereof may be dependent on geographical datum 102 wherein a particular geographic location may influence the determination of complementary data set 148 and/or the selection of a particular growth block 160. In one or more embodiments, complementary growth set may include regulations that are specific to a particular geographic area, tax codes that are particular to a specific geographic area, incentives, rules and the like that are particular to a specific geographic area as indicate by geographical datum 102. In one or more embodiments, each advisor profile 156 may be associated with a particular geographical datum 102 wherein association may include that the physical presence of the advisor profile 156 is associated with the particular geographic location and/or that the particular advisor profile 156 is knowledge about data sets that are associated with a particular geographic location as indicated by geographical datum 102. In one or more cases, processor 108 may be configured to select advisor profile 156 as a function of geographical datum 102 wherein a particular advisor profile 156 may be associated to the geographical datum 102. In one or more embodiments, complementary data set 148 may be determined as a function of one or more descriptors 140 wherein advisor profiles 156 containing similar descriptors as system data 120 or user data 196 may be determined.

With continued reference to FIG. 1, processor 108 may be configured to select and/or determine one or more complementary data sets 148 of the plurality of complementary data sets 148 determined as a function of at least system data 120 using a machine-learning model. In one or more embodiments, processor 108 may be configured to select and/or determine one or more complementary data sets as a function of the system data 120 and a machine learning model. In one or more embodiments, processor 108 may first be configured to determine a plurality of complementary data sets 148 and in a next step, select one or more complementary data sets 148 of the plurality of complementary data sets 148. Processor 108 may use a machine learning module, such as complementary machine-learning module for the purposes of this disclosure, to implement one or more algorithms or generate one or more machine-learning models, such as a complementary machine-learning model 168, to generate one or more complementary data sets 148. However, machine-learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or be provided by a user. In other embodiments, a machine-learning module may obtain a training set by querying a communicatively connected database 116 that includes past inputs and outputs. Training data may include inputs from various types of databases 116, resources, and/or inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, and without limitation, associating data elements with one or more descriptors 140 corresponding to categories of data elements. As a non-limiting example, training data may include data entered in standardized forms by persons or processes, such that entry of a given data element in a given field in a form may be mapped to one or more categories. Elements in training data may be linked to categories by tags, tokens, or other data elements. A machine learning module, such as complementary machine learning module, may be used to generate complementary machine learning model 168 and/or any other machine learning model described herein using training data. Complementary machine learning model 168 may be trained by correlated inputs and outputs of training data. Training data may be data sets that have already been converted from raw data whether manually, by machine, or any other method. Complementary training data 164 may be stored in database 116. Complementary training data 164 may also be retrieved from database 116. In one or more embodiments, complementary training data 164 may allow computing device 104 to compare two data items, to sort efficiently, and/or to improve the accuracy of analytical methods. In one or more embodiments, complementary training data 164 may be used to improve the accuracy of generating and/or selecting one or more complementary data sets 148. In one or more embodiments, training data may contain classified inputs and classified outputs wherein outputs may contain a higher degree of accuracy by outputting elements with a similar classification. For example, and without limitation, a particular complementary data set 148 may be classified to one or more descriptors 140 wherein system data 120 may be categorized to the same descriptors 140. With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from database 116, such as any database 116 described in this disclosure, or be provided by a user such as a prospective employee, and/or an employer and the like. In other embodiments, production machine-learning module may obtain a training set by querying a communicatively connected database 116 that includes past inputs and outputs. Training data may include inputs from various types of databases 116, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, and without limitation, associating data elements with one or more descriptor categorizations corresponding to categories of data elements. As a non-limiting example, training data may include data entered in standardized forms by persons or processes, such that entry of a given data element in a given field in a form may be mapped to one or more of categories. Elements in training data may be linked to categories by tags, tokens, or other data elements.

With continued reference to FIG. 1, in one or more embodiments selecting one or more complementary data sets 148 may include receiving complementary training data 164 including a plurality of system data 120 correlated to a plurality of complementary data sets 148. In an embodiment, a particular system data 120 may be correlated to one or more complementary data sets 148. In one or more embodiments, complementary training data 164 may include a plurality of classified system data 120 correlated to a plurality of complementary data sets 148. In an embodiment, a system data 120 with association to one or more descriptors 140 may indicate a particular complementary data set 148. In yet another embodiment, complementary training data 164 may include a plurality of system data 120 and/or classified system data 120 correlated to a plurality of growth blocks 160. In an embodiment, a particular system data 120 and/or classified system data 120 may indicate one or more growth blocks 160. In an embodiment, processor 108 may 'select' a particular complementary data set 148 through the selection of one or more growth blocks 160 correlated to system data 120 and through the determination of complementary data set 148 using the growth blocks 160. In one or more embodiments, complementary training data 164 may be received from a user, an advisor profile 156, a third party, a database 116, external computing devices 104, using a web crawler 128 and the like or as described in this disclosure. In an embodiment, complementary training data 164 may include previous iterations of system data 120 and previous iterations of complementary data sets 148. In one or more embodiments, complementary training data 164 may be used to train a complementary machine learning model 168. In one or more embodiments, one or more complementary data sets 148 may be determined as a function of complementary machine learning model 168. In an embodiment, complementary machine learning model 168 may be trained through user input wherein a user and/or advisor profile 156 may indicate if a particular complementary data set 148 was a match. Similarly a user and/or advisor profile 156 may input if a particular growth block 160 was suitable for the complementary data set 148. In an embodiment, feedback on each growth block 160 may allow for training of the machine learning model wherein input is received on each element of set of elements rather than the entire data set.

With continued reference to FIG. 1, in one or more embodiments, complementary machine-learning model 168 may further be configured to remove at least one element within complementary data set 148. "Element", for the purposes of this disclose, is a portion of a complementary data set. For example, and without limitation, element may include a portion of complementary data set 148. In one or more embodiments, portion may include anything within a data set from a single world to multiple documents and/or paragraphs of words. In one or more embodiments, at least one element may be an element that is not needed, an element that conflicts with another element within complementary data set 148, and the like. For example, and without limitation, element may include similarly generated growth blocks. Continuing, two growth blocks relating to instruction of franchising may be generated for a complementary data set wherein one growth block may be removed. In an embodiment, while a plurality of elements and/or growth blocks 160 may be generated for each complementary data set 148, not all the elements or growth blocks 160 may be beneficial. In an embodiment, it may be more beneficial to determine a particular complementary data set 148 having an excess of information and remove any unwanted elements after matching. In an embodiment, determined complementary data sets 148 may contain multiple sets of information and/or growth blocks 160 wherein one or more sets of information and/or growth blocks 160 may be inconsistent with one another. In an embodiment, a standard for removing elements may be more stringent than a standard for keeping elements within complementary data set 148, wherein the presence of a particular element within complementary data set 148 may be given deference in comparison to elements that have not been selected. In an embodiment, the determination of complementary data sets 148 with more than required information and/or more than necessary complementary approach blocks may allow for overinclusion of a particular complementary data set 148. In an embodiment, the determination of complementary data set 148 may be viewed as a "lenient" standard wherein any elements within association to system data 120 may be added. In an embodiment, the selection of complementary data set 148 may include the removal of unwanted elements wherein unwanted elements are remove on a "strict" standard wherein elements must not possess any value or may contain conflicting information in comparison to other elements.

With continued reference to FIG. 1, processor 108 may be configured to select a corresponding complementary data set 148 based on a geographical datum 102. Similarly, processor 108 may be configured to select a particular advisor profile 156 associated with geographical datum 102.

With continued reference to FIG. 1, in one or more embodiments, complementary data sct 148 may include an advisor profile 156 prior to selection and/or determination. Additionally or alternatively, complementary data sets 148 may be associated with, and/or classified to, advisor profile 156 after selection and/or determination. In one or more embodiments, complementary data set 148 may retrieve one or more advisor profiles 156 from a database 116 and classify one or more advisor profiles 156 to each complementary data set 148. In an embodiment, each advisor profile 156 may be classified to a particular complementary data set 148 containing information in which they hold themselves out as being proficient in. In an embodiment, each complementary data set 148 may include one or more elements that may be unique and/or distinct to a particular advisor profile 156. For example, and without limitation, a particular complementary data set 148 may include information about franchising a fast-food chain wherein an advisor profile 156 associated with fast food chains may be classified to the complementary data set 148. In an embodiment, it may be immature to classify a particular advisor profile 156 to a particular complementary data set 148 prior to determination and/or selection. In one or more embodiments, the combination of elements and/or growth blocks 160 within complementary data set 148 may require a differing advisor profile 156 than the advisor profile 156 originally placed within a particular complementary data det. In an embodiment, the removal of an element (e.g., such as the removal of a growth block 160) within complementary data set 148 may require a differing advisor profile 156 such as one originally selected.

With continued reference to FIG. 1, processor 108 may be configured to classify one or more advisor profiles 156 to complementary data set 148 as a function of geographical datum 102 within system data 120. In one or more embodiments, processor 108 may be configured to select advisor profiles 156 based on their geographic location, wherein the presence of an advisor profile 156 may indicate classification to one or more complementary data sets 148. In one or more embodiments, each advisor profile 156 may include a geographical location wherein processor 108 may use geographical location to determine a distance between advisor profile 156 and geographical datum 102. In one or more embodiments, processor 108 may be configured to select only advisor profiles 156 associated with the same city, city, state and/or country of geographical datum 102. In one or more embodiments, professor may be configured to select only advisor profiles 156 within a particular distance of geographic datum, such as for example, and without limitation, within 200 miles. In one or more embodiments, processor 108 may be configured to classify one or more advisor profiles 156 to complementary data set 148 and narrow the one or more advisor profiles 156 based on their geographic location. In one or more embodiments, a particular advisor profile 156 may be proficient in data sets that are associated with a particular geographic location wherein processor 108 may select only those advisor profiles 156 that are proficient. In one or more embodiments, each advisor profile 156 may contain one or more geographic locations wherein the presence of a particular geographic location may indicate that a particular advisor profile 156 may be proficient in a data set associated with that location. In a non-limiting example, an advisor profile 156 may be proficient with franchising in one state, while not proficient in another.

In one or more embodiments, processor 108 may classify one or more advisor profiles 156 to one or more complementary data sets 148. In one or more embodiments, one or more advisor profiles 156 may be classified to one or more complementary data sets 148 as a function of one or more descriptors 140. In one or more embodiments, each advisor profile 156 may be associated with one or more descriptors 140 wherein processor 108 may select one or more advisor profiles 156 having one or more similar descriptors 140 as complementary data set 148. For example, and without limitation, processor 108 may classify a particular advisor profile 156 to a particular complementary data set 148 wherein the advisor profile 156 and the complementary data set 148 are both classified and/or associated to the particular advisor profile 156. In one or more embodiments, processor 108 may use descriptor classifier 144 (as described above) to classify one or more advisor profiles 156 to a particular descriptor 140. In one or more embodiments, the descriptor classifier 144 may be trained with training data correlating a plurality of advisor profiles 156 to a plurality of descriptors 140. In one or more embodiments, each advisor profile 156 may input one or more descriptors 140 in which they hold themselves out as being proficient in. For example, and without limitation, a particular advisor profile 156 may input one or more descriptors 140 wherein each input may indicate that the advisor profile 156 has the requisite knowledge of the particular descriptor 140. In one or more embodiments, processor 108 may be configured to modify one or more selected complementary data sets 148, wherein modification may include the input of one or more advisor profiles 156 within complementary data set 148.

In one or more embodiments, processor may be configured to select one or more advisor profiles 156 as a function of the classification of system data 120 to one or more descriptors 140. In an embodiment, processor may select one or more advisor profiles 156 that are associated and/or classified to the same descriptors 140 as system data 120. In an embodiment, processor 108 may be configured to determine a plurality of complementary data sets 148 providing one or more advisor profiles 156, wherein a user may select a particular advisor profile 156 to assist in the selection of one or more complementary data sets 148.

With continued reference to FIG. 1, processor 108 is configured to transmit one or more complementary data sets 148 to a user device 172. User device 172 may be consistent with computing device 104 and/or processor 108 as described above. In one or more embodiments, user device 172 may include a remote device. In one or more embodiments, remote device may be located in a differing geographical location, such as a differing city, state, and the like. In one or more embodiments, processor 108 and/or computing device 104 may include a server and/or database 116, wherein processor 108 and/or computing device 104 may be communicatively connected to user device 172. In one or more embodiments user device 172 may include a laptop, a desktop, a smart tablet, a smart phone, a smart watch and/or any device containing a processing unit and configured to receive and transmit data. In one or more embodiments, transmitting the one or more complementary data sets 148 to user device 172 may include transmitting one or more complementary data sets 148 to user. In one or more embodiments, processor 108 may be configured to transmit one or more complementary data sets 148 to user, wherein user may view the determined and selected complementary data sets 148. In one or more embodiments, user may be associated with user device 172 wherein transmission of data to user device 172 includes transmission of data to user. In one or more embodiments, user may be tasked with viewing one or more complementary data sets 148 and selecting a particular complementary data set 148.

With continued reference to FIG. 1, processor 108 may be configured to transmit one or more complementary data sets 148 to a user interface. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database 116 wherein the data may be accessed from database 116 Processor 108 may further transmit the data above to a device display or another computing device 104. In one or more embodiments, processor 108 may be configured to transmit user interface including one or more complementary data sets 148 to user device 172 wherein user may view and interact with one or more complementary data sets 148 through user interface.

With continued reference to FIG. 1, processor 108 may further be configured to modify a user interface and/or graphical user interface as a function of one or more complementary data sets 148. In one or more embodiments, processor 108 is configured to generate a user interface data structure. As used in this disclosure, "user interface data structure" is a data structure representing a specialized formatting of data on a computer configured such that the information can be effectively stored and presented for a user interface. User interface data structure may include one or more complementary data sets 148 and any other data described in this disclosure. In one or more embodiments, user interface data structure may include one or more complementary data sets 148 and one or more advisor profiles 148. In one or more embodiments, user interface data structure may be transmitted to user device 172 wherein user device 172 may be configured to receive user interface data structure and visually present one or more complementary data sets 148 and one or more advisor profiles 156.

With continued reference to FIG. 1, apparatus 100 may include a graphical user interface (GUI 176). For the purposes of this disclosure, a "user interface" is a means by which a user and a computer system interact. For example, and without limitation, through the use of input devices and software. In one or more embodiments, processor 108 may be configured to modify a user interface and/or graphical user interface as a function of the one or more complementary data sets 148 by populating user interface data structure with one or more complementary data sets 148 and visually presenting the one or more complementary data sets 148 through modification of the graphical user interface. A user interface may include graphical user interface 176, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, and without limitation, a smart phone, smart tablet, or laptop operated by the user and/or participant. In one or more embodiments, user may interact with graphical user interface through user device 172. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI 176 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface. Persons skilled in the art, upon reviewing the entirety of this disclosure, will be aware of various ways in which a graphical user interface and/or elements thereof may be implemented and/or used as described in this disclosure.

With continued reference to FIG. 1, apparatus 100 may further include a display device communicatively connected to at least a processor 108. "Display device" for the purposes of this disclosure, is a device configured to show visual information. In one or more embodiments, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In one or more embodiments, display device may be configured to visually present one or more data through GUI 176 to a user, wherein a user may interact with the data through GUI 176. In one or more embodiments, a user may view GUI 176 through display. In one or more embodiments, user device 172 may be communicatively connected to display wherein a user may view GUI 176 through display and input one or more data elements using one or more inputs methods as described in this disclosure.

With continued reference to FIG. 1, GUI 176 may generate a visual representation of one or more complementary data sets 148 in a display of a device for showing to user. In one or more embodiments, GUI 176 may visually present one or more elements of each complementary data set 148. In one or more embodiments, user may view each generated growth blocks 160 of each complementary data set 148. In one or more embodiments, GUI 176 may visually present complementary data sets 148 as clickable graphical elements wherein each graphical element is associated with a particular complementary data set 148. In one or more embodiments, selection of graphical element may indicate selection of a particular complementary data set 148. In one or more embodiments, selection of graphical element may indicate to processor 108 to display elements of complementary data set 148 to user. In one or more embodiments, GUI 176 may visually present the degree of match of each complementary data set 148 wherein a selection may be made based on the degree of match. In one or more embodiments, a user may be put on notice of advisors who contain a high degree of match with user and allow user to make an informative decision. In one or more embodiments, processor 108 may be configured to modify GUI 176 as function of the one or more complementary data sets 148 to generate a graphical view. The graphical view may include at least a display element generated as a function of one or more complementary data sets 148. A "display element," as used in this disclosure, is an image that a program and/or data structure may be shown on a display of a device such as display component. Display elements may include, without limitation, windows, pop-up boxes, web browser pages, display layers, and/or any other display element that may occur to a person skilled in the art upon reviewing the entirety of this disclosure. Graphical view includes a first selectable graphic corresponding to a first selectable event handler. A "selectable graphic," as used in this disclosure, is a graphical element that upon selection using a cursor or other locator as manipulated using a locator device such as a mouse, touch-screen, track pad, joystick, or the like will trigger an action to be performed on apparatus 100 and/or computing device 104. In some cases, the actions may include operation of one or more event handlers. In some cases, one or more routines may be executed by an event handler when a selectable graphic is pressed. As a non-limiting example, events and/or routines associated with a selectable graphic may include a redirection link, defined as a hyperlink, button, image, portion of an image, and/or other graphic containing or referring to a uniform resource locator (URL) and/or other resource locator to another graphical view including without limitation buttons, and/or to a process that performs navigation to such URL and/or other resource locator upon selection of selectable event graphic. Redirection may further include redirection to another step of the processing and/or other display windows within apparatus 100. Redirection may be performed using any event handler, including without limitation event handlers detecting the click of a mouse or other locator, access of redirection link using a touchscreen, the selection of any key, mouseover events, or the like. First selectable graphic may be configured to trigger a first action if first selectable graphic is selected. First action may include instructions from processor 108 to communicate an advisor associated with one or complementary data sets. First action may further include instructions to update select a complementary data 148 and/or advisor profile and communicate with the advisor associated with complementary data set that a selection has been made. In one or more embodiments, first action may include instruction to display a "pop-up window" wherein the pop-up window may display elements of complementary data set, 148, advisor profile 156 and the like and the like. In some cases, graphical view may include more than one selectable graphics wherein selection of each selectable graphic may trigger an action. In one or more embodiments selectable graphics may be associated with complementary data sets 148 and/or advisor profiles 156. For example, selectable graphic may include a visual illustration of the advisor profile 156 such as an image of the advisor or a logo or illustration associated with an entity that the advisor works as an agent of. In one or more embodiments, the visual illustrations may be received from database 116 and/or each user advisor profile 156.

With continued reference to FIG. 1, in instances wherein one or more complementary data sets includes an advisor profile 156, GUI 176 may display the advisor profile 156 and associated information. In one or more embodiments, GUI 176 may visually present elements of advisor profile 156 such as information associated with communication with the advisor, the name of the advisor, the location of the advisor, the expertise of the advisor and the like. In one or more embodiments, processor 108 may be configured to display one or more complementary data sets 148 wherein a user may be given a singular advisor profile 156 in which the user has been matched with. In one or more embodiments, processor 108 may transmit the GUI 176, user interface data structure and/or complementary data set 148 to user device 172. In one or more embodiments, first computing device may be associated with user. In one or more embodiments, processor 108 may be configured to transmit GUI 176, user interface data structure and/or complementary data set 148 to second computing device. 188. In one or more embodiments, processor 108 may be configured to transmit system data 120 to remote device 188. In one or more embodiments, remote device 188 may be associated with an advisor or advisors within one or more complementary data sets 148 wherein the advisors may receive system data 120 associated with the user. In one or more embodiments, system data 120 may allow for an advisor to provide proper guidance with respect to franchising. In one or more embodiments, system data 1230 may include user data 196 wherein the advisor may be given information needed to communicate with the user. In one or more embodiments, processor may be configured to transmit system data 196 to a remote device 188 as a function of one or more complementary data sets 148 wherein processor 108 may be configured to transmit system data to an advisor associated with advisor profile 156. In one or more embodiments, remote device 188 may be associated with an advisor within advisor profile 156 wherein processor 108 may transmit the system data 120 to the selected advisor within complementary data set 148. In one or more embodiments, processor 108 may be configured to transmit complementary data set to at least remote device 188. In one or more embodiments, system data 196 may be encrypted and stored on database. In one or more embodiments, processor 108 may be configured to transmit a decryption key 192 to remote device 188 wherein an advisor associated with remote device 188 may have access to system data 196. In one or more embodiments, processor 108 may be configured to transmit complementary data set to remote device 188.

With continued reference to FIG. 1, processor 108 may be configured to receive a response 180 from user device 172. "Response", for the purposes of this disclosure, is an input associated with a selection of one or more complementary data sets 148. For example, and without limitation, response 180 may include a selection of one or more complementary data sets 148. In one or more embodiments, user may be given one or more complementary data sets 148 and/or one or more advisor profiles 156 wherein user may be tasked with selecting a particular complementary data set 148 and corresponding advisor profile 156. In an embodiment, processor 108 may be configured to display a plurality of complementary data sets 148 to user, wherein user may be configured to generate a response 180. In one or more embodiments, processor may display a plurality of complementary data sets 148 and a plurality of advisor profiles 156, wherein a user may be tasked with selecting a particular advisor profile. In one or more embodiments, an advisor may assist a user in selecting one or more complementary data sets 148. In one or more embodiments, a financial advisor associated with advisor profile may assist a user in selection of one or more complementary data sets 148 after a user selects a particular advisor profile. In one or more embodiments, generating response 180 may include receiving an input from user using one or more input devices (as described in this disclosure). This may include, but is not limited to, selection of complementary data set 148 through the clicking of a mouse, selection through input using a keyboard and the like. In one or more embodiments, processor 108 may be configured to receive user input 184, wherein user input 184 includes input by user and/or any other individual associated with apparatus 100. In one or more embodiments, user input 184 may include selection of one or more advisor profiles 156. In one or more embodiments, processor 108 may display one or more complementary data sets 148 and one or more advisor profiles 156 wherein user may be tasked with selecting at least one of the one or more complementary data sets 148 and one or more advisor profiles 156.

With continued reference to FIG. 1, processor 108 is configured to receive a response 180 as a function of one or more complementary data sets 148 and user input 184 from user device 172. In one or more embodiments, processor 108 is configured to transmit response 180 to remote device 188. In one or more embodiments, remote device 188 may be associated with a particular advisor profile 156 and/or a particular advisor associated with advisor profile 156. In one or more embodiments, remote device 188 may be distinct from computing device 104. In one or more embodiments, remote device 188 may include a remote device that is separate and distinct from user device 172. In one or more embodiments, remote device 188 may be associated with a selected advisor profile 156. In one or more embodiments, processor 108 may be configured to receive a selection from user device 172 and transmit the selection to remote device 188. In one or more embodiments, processor 108 may transmit response 180 to a selected advisor profile 156 wherein the advisor associated with advisor profile 156 may contact user and facilitate the selection of a particular complementary data set 148 and/or facilitate the process of franchising a particular entity. In one or more embodiments, processor 108 may transmit response 180 as well as information associated with user wherein advisor profile 156 may contact user. In one or more embodiments, processor 108 may be configured to provide the selected advisor profile 156 as indicated in response 180 with the proper decryption key 192 to decrypt system data 120. In one or more embodiments, advisor profile 156 may decrypt system data 120 to verify the contents and/or make one or more determinations of system data 120. In one or more embodiments, processor 108 may receive a response 180 from user wherein processor 108 may be configured to transmit response 180 to the selected advisor profile 156 as well as decryption key 192 for decryption of system data 120.

Figure 2:
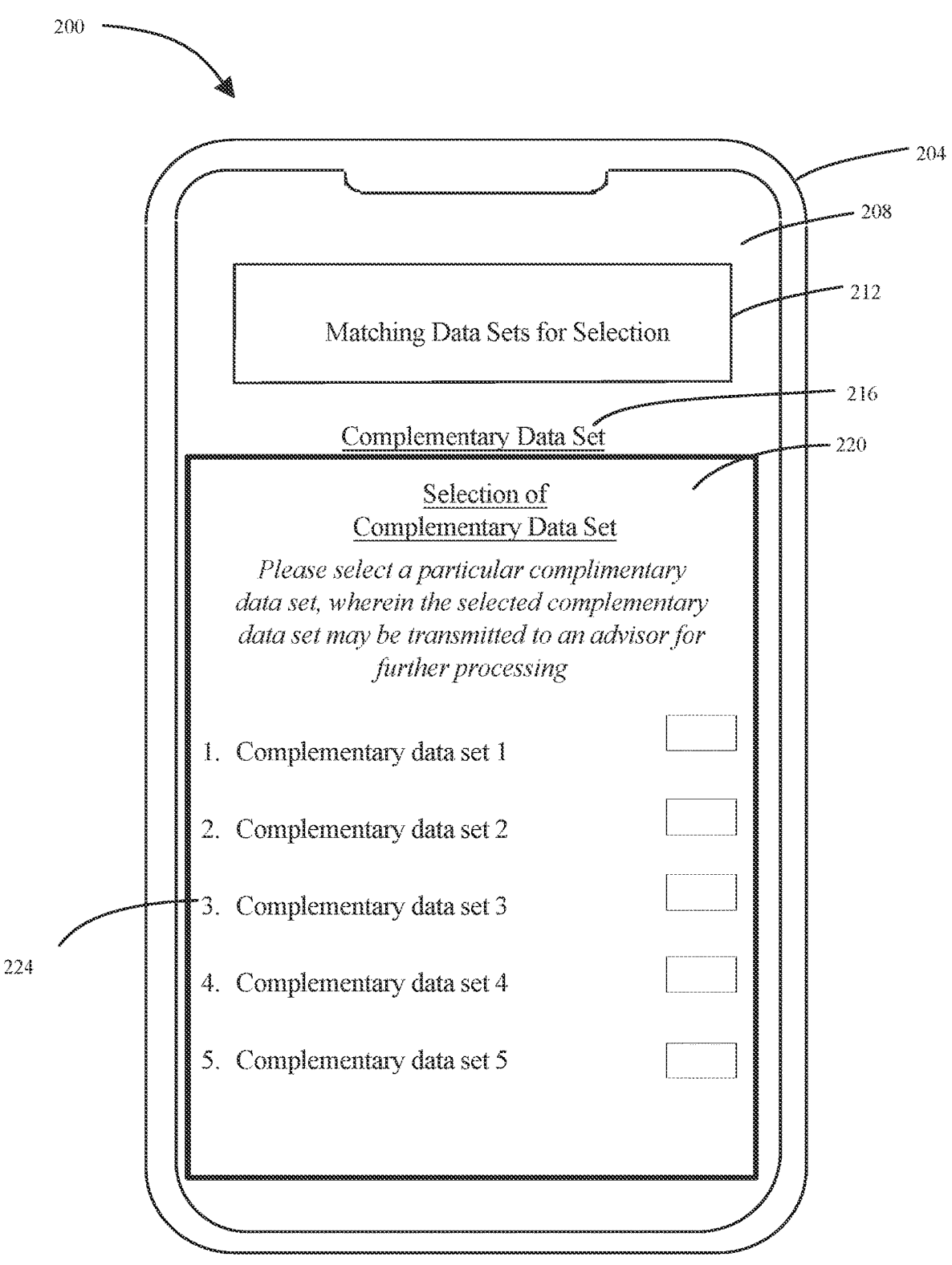
FIG. 2 is an exemplary embodiment of a graphical user interface in accordance with one or more embodiments of the present disclosure.

Referring now to FIG. 2, an exemplary embodiment of a GUI 200 on a display device 204 is illustrated. GUI 200 is configured to receive the user interface structure as discussed above and visually present any data described in this disclosure. Display device 204 may include, but is not limited to, a smartphone, tablet, laptop, monitor, tablet, and the like. Display device 204 may further include a separate device that includes a transparent screen configured to display computer generated images and/or information. In one or more embodiments, GUI 200 may be displayed on a plurality of display devices. In one or more embodiments, GUI 200 may display data on separate windows 208. A "window" for the purposes of this disclosure, is the information that is capable of being displayed within a border of device display. A user may navigate through different windows 208 wherein each window 208 may contain new or differing information or data. For example, and without limitation, a first window 208 may display information relating to data set, whereas a second window may display information relating to the data modules as described in this disclosure. A user may navigate through a first second, third and fourth window (and so on) by interacting with GUI 200. For example, and without limitation, a user may select a button or a box signifying a next window on GUI 200, wherein the pressing of the button may navigate a user to another window. In one or more embodiments, GUI 200 may further contain event handlers, wherein the placement of text within a textbox may signify to computing device to display another window. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, and without limitation, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, and without limitation, an event handler may be programmed to generate a notification screen following a user input wherein the notification screen notifies a user that the data was properly received. In one or more embodiments, an event handler may be used to signify to processor that an action has selection has been made. For example, and without limitation, a selection of a graphical icon or a particular data element through GUI may indicate to processor that a selection has been made. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input. In this instance, an event handler may be used to navigate a user through various windows 208 wherein each window 208 may request or display information to or from a user. In this instance, window 208 displays an identification field 212 wherein the identification field signifies to a user, the particular action/computing that will be performed by a computing device. In this instance identification field 212 contains information stating "Matching Data Sets for Selection" wherein a user may be put on notice that any information being received or displayed will be used for matching data sets for selection of a complementary data set. This may be done through the receipt of system data, the determination of one or more complimentary data sets and/or the selection of one or more complementary data sets as described in this disclosure. Identification field 212 may be consistent throughout multiple windows 208. Additionally, in this instance, window 208 may display a sub identification field 216 wherein the sub identification field may indicate to a user the type of data that is being displayed or the type of data that is being received. In this instance, sub identification field 216 contains "Complementary Data Set". This may indicate to a user that computing device is currently collecting information relating to one or more complementary data sets. For example, and without limitation, in this instance, computing device may be requesting a selection of a particular complementary data set.

Additionally, window 208 may contain a prompt 220 indicating the data that is being described in sub identification field 216 wherein prompt 220 is configured to display to a user instruction on what the user should be doing in the current window 208. In this instance prompt 220 informs an individual to selected a particular complementary data set. In this instance, GUI 200 may contain a selection 224 wherein selection 224 may contain one or more complementary data sets to be selected from on. In one or more embodiments, selection may include input boxes wherein a user may indicate a preference of a particular complementary data set through input in one of the input boxes.

With continued reference to FIG. 2, GUI 200 may be configured to receive user feedback. For example, and without limitation, GUI may be configured to determine one or more complementary data sets wherein a user may interact with GUI 200 and provide feedback on the determined data. In one or more embodiments, a user may desire to view multiple complementary data sets wherein a user may navigate back and forth through various windows to select one or more complementary data sets and view any corresponding information associated with the complementary data sets. In one or more embodiments, user feedback may be used to train a machine learning model as described above. In one or more embodiments, user feedback may be used to indicate computing device to determine alternative complementary data sets.

Figure 3:
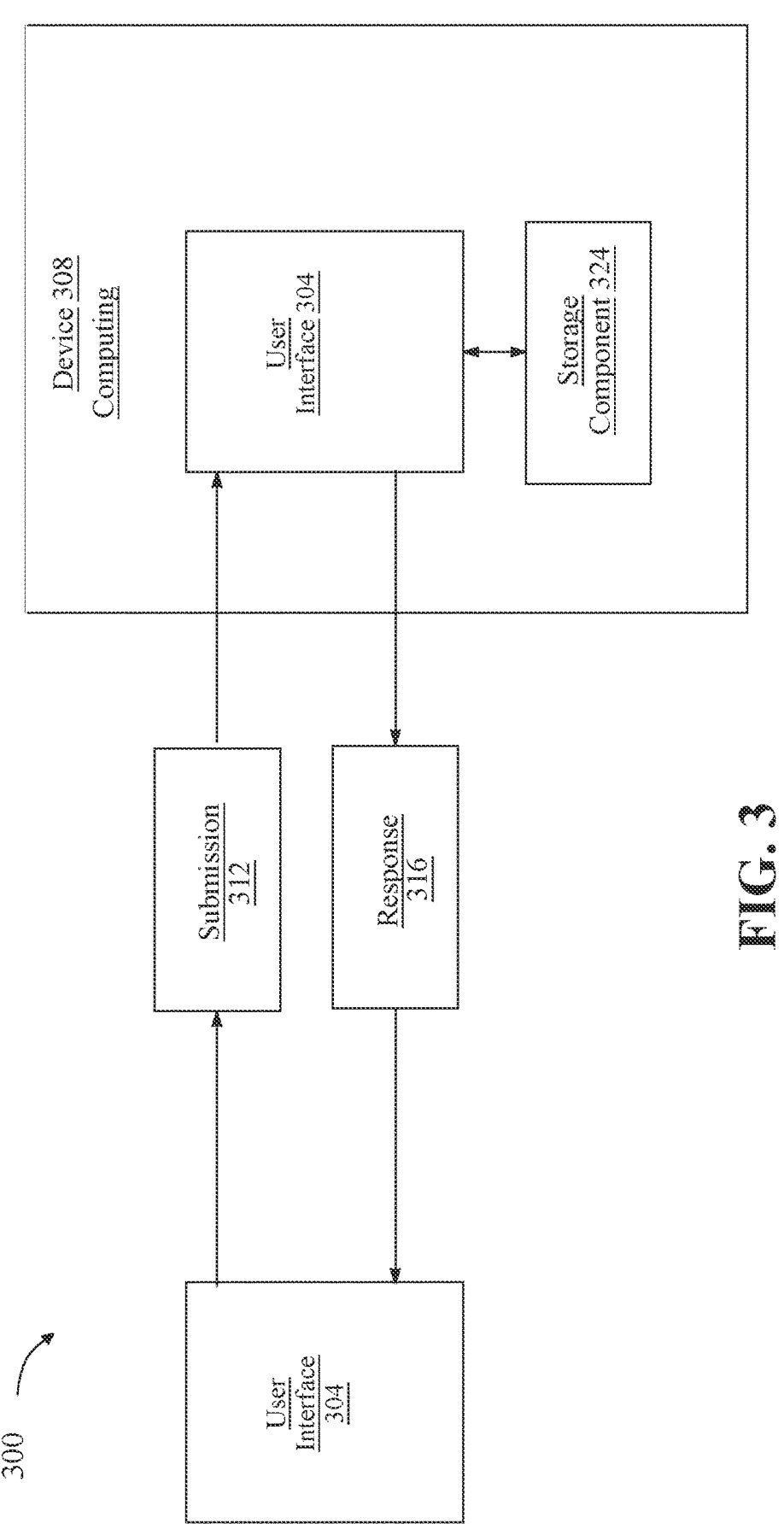
FIG. 3 is a block diagram of exemplary embodiment of a chatbot in accordance with one or more embodiments of the present disclosure.

Referring to FIG. 3, a chatbot system 300 is schematically illustrated. According to some embodiments, a user interface 304 may be communicative with a computing device 308 that is configured to operate a chatbot. In one or more embodiments, user interface 304 may be local to computing device 308. Alternatively or additionally, in one or more embodiments, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface

304. In many cases, one or both of submission 312 and response 316 are text-based communication. Alternatively or additionally, in one or more embodiments, one or both of submission 312 and response 316 are audio-based communication.

Continuing in reference to FIG. 3, a submission 312 once received by computing device 308 operating a chatbot, may be processed by a processor 320. In some embodiments, processor 320 processes a submission 3112 using one or more of keyword recognition, pattern matching, and natural language processing. In some embodiments, processor employs real-time learning with evolutionary algorithms. In one or more embodiments, processor 320 may retrieve a pre-prepared response from at least a storage component 324, based upon submission 312. Alternatively or additionally, in some embodiments, processor 320 communicates a response 316 without first receiving a submission 312, thereby initiating conversation. In one or more embodiments, processor 320 communicates an inquiry to user interface 304; and the processor is configured to process an answer to the inquiry in a following submission 312 from the user interface 304. In one or more embodiments, an answer to an inquiry present within a submission 312 from a user device 304 may be used by computing device 104 as an input to another function, for example without limitation at least a feature 108 or at least a preference input 112.

Figure 4:
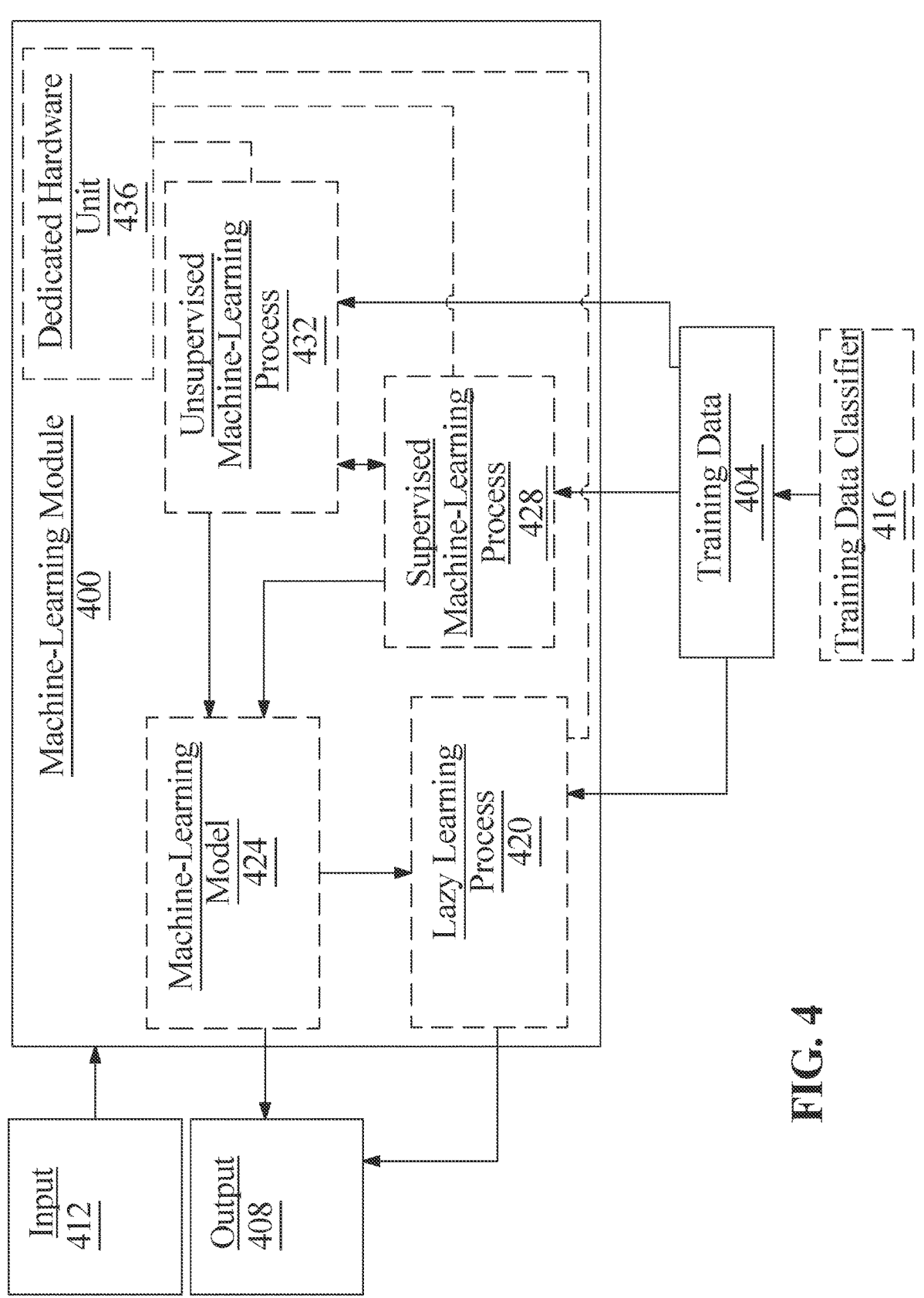
FIG. 4 is a block diagram of exemplary embodiment of a machine-learning module in accordance with one or more embodiments of the present disclosure.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below.

Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include inputs such as system data, and outputs may include outputs such as complementary data set as described above. As another non-limiting example, inputs may include inputs such as complementary data set wherein outputs may include selected complementary data sets.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to one or more descriptors 140. In an embodiment, a particular set or grouping of elements may be associated with a particular growth block 160 as described above. In an embodiment, each input may be classified to the same descriptor 140 as the output. In an embodiment, each descriptor 140 may be associated with a particular input and output. In one or more embodiments, descriptors may allow for minimization of accurate outputs wherein a particular input may only allow for a particular output based on its classification. In an embodiment, classification may allow for optimization of the machine learning model. In an embodiment, classification may allow for quicker processing as computing device is limited to a smaller sample of outputs. In one or more embodiments, inputs such as user data 196, system data 120 and/or entity data 124 may be classified to one or more descriptors 140 and outputs such as complementary data set 148 and/or advisor profiles 156 may be classified to descriptors 140. In one or more embodiments, training data may include inputs and correlated outputs classified to the same descriptors.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels.

It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to cleanup side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as system data 120 as described above as inputs, outputs such as complementary data sets 148 as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
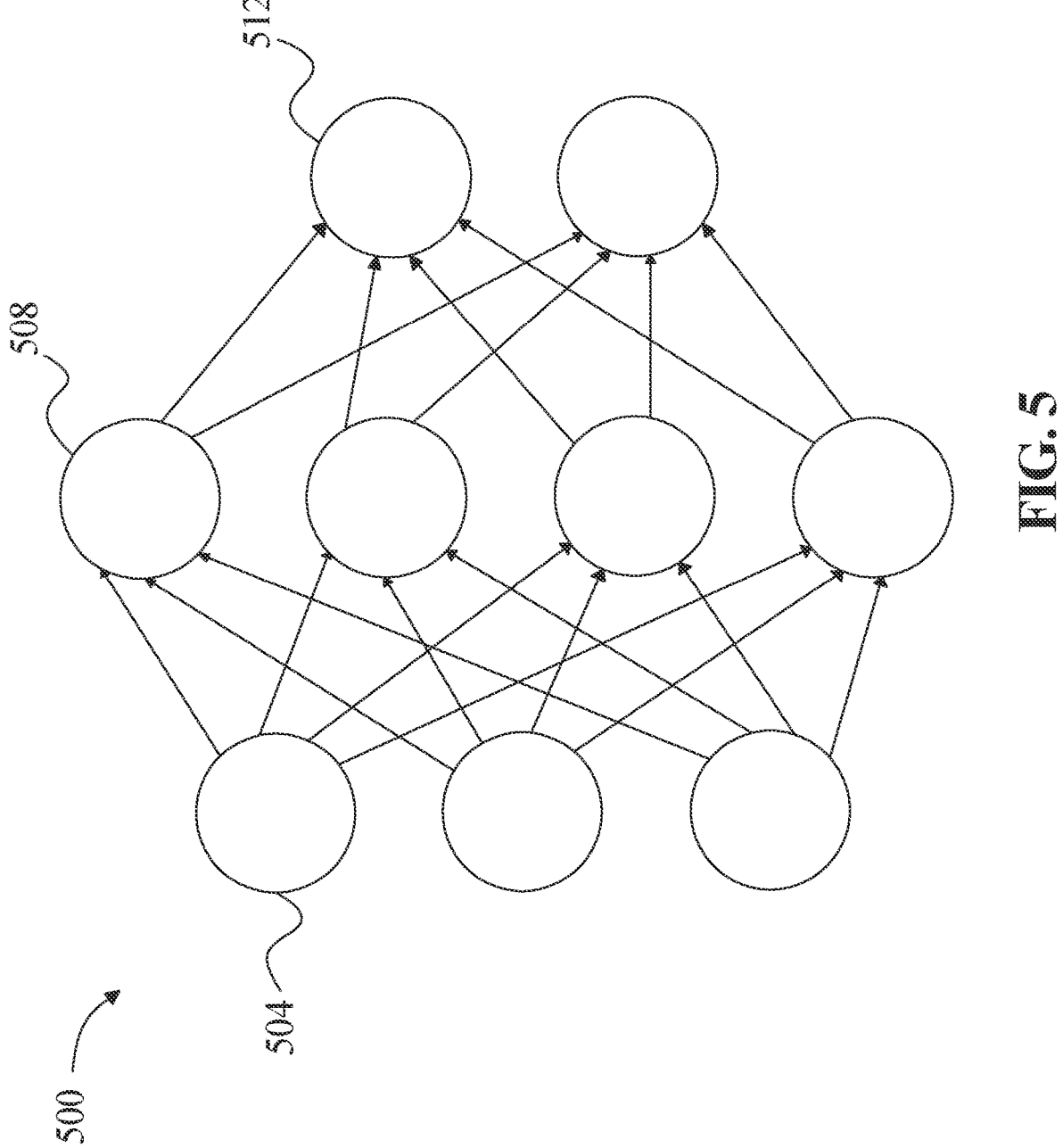
FIG. 5 is a diagram of an exemplary embodiment of a neural network in accordance with one or more embodiments of the present disclosure.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
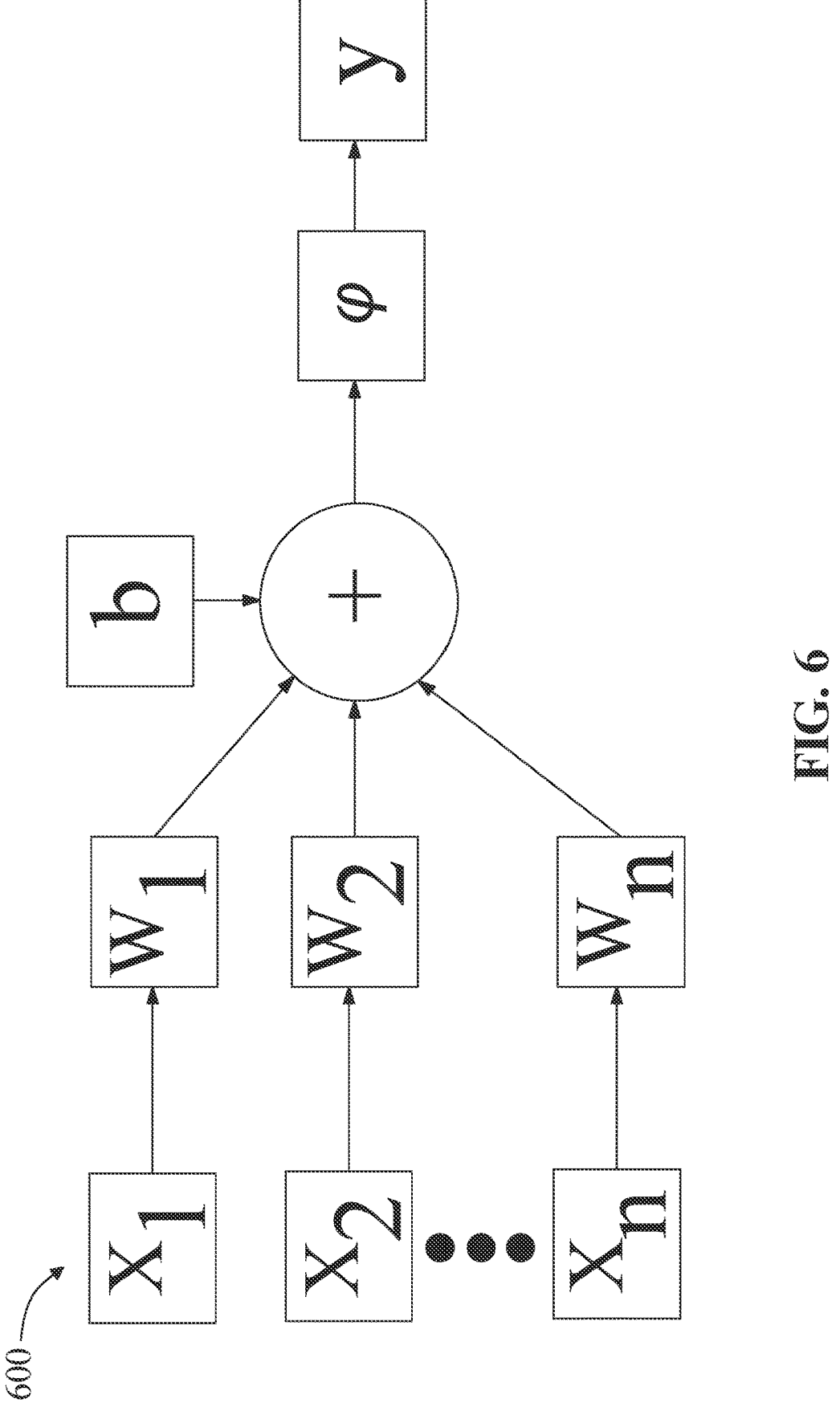
FIG. 6 is a block diagram of an exemplary embodiment of a node of a neural network in accordance with one or more embodiments of the present disclosure.

Referring now to FIG. 6, an exemplary embodiment of a node 700 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as f(x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as f(x)=a(1+tanh ($\sqrt{2/\pi}$(x+bx$^r$))) for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs x; that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 7, an exemplary method 700 for determining one or more complementary data sets is described. At step 705, method 700 includes receiving, by at least a processor, system data, wherein the system data includes user data and entity data. In one or more embodiments, the system data further includes at least one digital file. In one or more embodiments, receiving, by the at least a processor, the system data includes performing optical character recognition on at least one digital file. In one or more embodiments, receiving system data may further include encrypting system data and storing system data on database. In one or more embodiments, system data may be received by a chatbot system. This may be implemented with reference to FIGS. 1-6 and without limitation.

With continued reference to FIG. 7, at step 710, method 700 includes classifying, by the at least a processor, the system data to one or more descriptors. In one or more embodiments, classifying by the at least a processor, the system data to one or more descriptors includes classifying the system data using a descriptor classifier. This may be implemented with reference to FIGS. 1-6 and without limitation.

With continued reference to FIG. 7, at step 715, method 700 includes retrieving a plurality of advisor profiles. This may be implemented with reference to FIGS. 1-6 and without limitation.

With continued reference to FIG. 7, at step 720, method 700 includes determining, by the at least a processor, a complementary data set as a function of the system data and the plurality of advisor profiles. In one or more embodiments, the complementary data set is determined using a web crawler. In one or more embodiments, the complementary data set includes one or more growth parameters. In one or more embodiments, determining by the at least a processor, the complementary data set includes receiving a plurality of growth blocks, wherein at least one of the plurality of growth blocks is generated using the web crawler, selecting at least one growth block of the plurality of growth blocks as a function of the classification of the system data to one or more descriptors and determine the complementary data set as a function of the selection. In one or more embodiment, determining, by the at least a processor, the complementary data set includes selecting by the at least a processor, the complementary data set as a function of the system data and a complementary machine-learning model. In one or more embodiments, selection of the complementary data set includes the removal of at least one element within the complementary data set. In one or more embodiments, selecting by the at least a processor, the complementary data set as a function of the system data and the complementary machine-learning model includes receiving complementary training data, wherein the complementary training data includes a plurality of system data inputs correlated to a plurality of complementary data set outputs, training the complementary machine learning model as a function of the complementary training data, selecting the complementary data sets as a function of the complementary machine learning model, and classifying one or more advisor profiles to the complementary data set. In one or more embodiments classifying one or more advisor profiles to the complementary data set further includes classifying one or more advisor profiles as a function of the geographical datum. This may be implemented with reference to FIGS. 1-6 and without limitation.

With continued reference to FIG. 7, at step 725 method 700 includes, generating, by the at least a processor, a user interface data structure wherein the user interface data structure includes at least the complementary data set. This may be implemented with reference to FIGS. 1-6 and without limitation.

With continued reference to FIG. 7, at step 730 method 700 includes transmitting, by the at least a processor, the complementary data sets to a remote device. In one or more embodiments, method 700 may include transmitting the complementary data set to user device. This may be implemented with reference to FIGS. 1-6 and without limitation.

With continued reference to FIG. 7, method 700 may include receiving, by the at least a processor, a response as a function of the one or more complementary data sets and a user input from the user device. In one or more embodiments, receiving the system data includes encrypting the system data and storing the system data on a database. This may be implemented with reference to FIGS. 1-6 and without limitation.

With continued reference to FIG. 7, method 700 may include transmitting, by the at least a processor, the complementary data set to at least remote. In one or more embodiments, method 700 may include transmitting, by the at least a processor, the response to remote device. In one or more embodiments, receiving by the at least a processor, a response as a function of the complementary data set and the user input from the user device includes selecting one of the one or more advisor profiles, and wherein the remote device is associated to the one of the one or more advisor profiles. In one or more embodiments, transmitting, by the at least a processor, the complementary data set to the remote device includes transmitting a decryption key to the remote device. This may be implemented with reference to FIGS. 1-6 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining complementary data sets, the apparatus comprising:

a processor; and a memory communicatively connected to the processor, the memory containing instructions configuring the processor to:

receive system data, wherein the system data comprises user data and entity data, wherein the user data comprises financial data related to a user, wherein the entity data comprises data related to a franchise, and wherein the entity data further comprises data relating to a plurality of retail chains available for franchising;

classify the system data to one or more descriptors wherein the system data is further classified using a classifier machine learning model, wherein the one or more descriptors comprise data related to an industry associated with the system data, wherein training the classifier machine learning model comprises:

receiving training data wherein the training data comprises a plurality of system data inputs to a plurality of descriptor outputs;

training the classifier machine learning model as a function of the training data;

selecting a system classification as a function of the classifier machine learning model;

retrieve a plurality of advisor profiles, wherein each advisor profile of the plurality of advisors comprises a rating of each advisor, wherein the rating of each advisor comprises a measurement of at least one capabilities of the advisor, wherein each advisor profile of the plurality of advisor profiles contains at least a descriptor indicating a requisite level of knowledge in a field of the at least a descriptor, wherein each advisor comprises a franchising financial advisor;

determine a complementary data set as a function of the classified system data and the plurality of advisor profiles, wherein the complementary data set comprises a requisite experience requirement, wherein the requisite experience requirement is associated with franchising:

match an advisory profile to the complementary data set, wherein the advisory profile is matched to the complementary data set as a function of a degree of match between the advisory profile and the user data;

determine a differing advisor profile as a function of a removal of data within the complementary data set;

generate a user interface data structure, wherein the user interface data structure comprises at least the complementary data set; and transmit the complementary data set to at least a remote computing device.

2. The apparatus of claim 1, wherein:
the system data further comprises at least one digital file; and
receiving the system data comprises performing optical character recognition on the at least one digital file.

3. The apparatus of claim 1, wherein classifying the system data to one or more descriptors comprises classifying the system data using a descriptor classifier.

4. The apparatus of claim 1, wherein the complementary data set comprises a 5. growth parameter.

5. The apparatus of claim 1, wherein determining the complementary data set comprises:
receiving a plurality of growth blocks, wherein the plurality of growth blocks is generated using a web crawler; and
selecting at least one growth block of the plurality of growth blocks as a function of the classification of the system data to the one or more descriptors; and
generating the complementary data set as a function of the selection.

6. The apparatus of claim 1, wherein determining the complementary data set comprises determining the complementary data set as a function of the system data and a complementary machine-learning model.

7. The apparatus of claim 6, wherein determining the complementary data set as a function of the system data and the complementary machine-learning model comprises:
receiving complementary training data, wherein the complementary training data comprises a plurality of system data inputs correlated to a plurality of complementary data set outputs;
training the complementary machine-learning model as a function of the complementary training data;
selecting a complementary data set as a function of the complementary machine-learning model; and
classifying one or more advisor profiles to the complementary data set.

8. The apparatus of claim 7, wherein classifying the one or more advisor profiles to the complementary data set further comprises classifying one or more advisor profiles as a function of the at least a geographical datum.

9. The apparatus of claim 1, wherein:
receiving the system data comprises:
encrypting the system data; and
storing the system data on a database; and
transmitting the complementary data set to at least the remote device comprises transmitting a decryption key to the remote device.

10. A method for determining complementary data sets, the method comprising:
receiving, by at least a processor, system data, wherein the system data comprises user data and entity data, wherein the user data comprises financial data related to a user, wherein the entity data comprises data related to a franchise, and wherein the entity data further comprises data relating to a plurality of retail chains available for franchising;

classifying, by the at least a processor, the system data to one or more descriptors wherein the system data is further classified using a classifier machine learning model, wherein the one or more descriptors comprise data related to an industry associated with the system data, wherein training the classifier machine learning model comprises:
receiving training data wherein the training data comprises a plurality of system data inputs to a plurality of descriptor outputs;
training the classifier machine learning model as a function of the training data;
selecting a system classification as a function of the classifier machine learning model;

retrieving, by the at least a processor, a plurality of advisor profiles, wherein each advisor profile of the plurality of advisors comprises a rating of each advisor, wherein the rating of each advisor comprises a measurement of at least one capabilities of the advisor, wherein each advisor profile of the plurality of advisor profiles contains at least a descriptor indicating a requisite level of knowledge in a field of the at least a descriptor, wherein each advisor comprises a franchising financial advisor;

determining, by the at least a processor, a complementary data set as a function of the system data and the plurality of advisor profiles, wherein the complementary data set comprises a requisite experience requirement, wherein the requisite experience requirement is associated with franchising;

matching, by the processor, an advisory profile to the complementary data set, wherein the advisory profile is matched to the complementary data set as a function of a degree of match between the advisory profile and the user data;

determining, by the processor a differing advisor profile as a function of a removal of data within the complementary data set;

generating, by the at least a processor, a user interface data structure wherein the user interface data structure comprises at least the complementary data set; and transmitting, by the at least a processor, the complementary data set to at least a remote device.

11. The method of claim 10, wherein:
the system data further comprises at least one digital file; and
receiving, by the at least a processor, the system data comprises performing optical character recognition on the at least one digital file.

12. The method of claim 10, wherein classifying by the at least a processor, the system data to one or more descriptors comprises classifying the system data using a descriptor classifier.

13. The method of claim 10, wherein the complementary data set comprises one or more growth parameters.

14. The method of claim 10, wherein determining, by the at least a processor, the complementary data set comprises:
receiving a plurality of growth blocks, wherein the plurality of growth blocks is generated using a web crawler; and
selecting at least one growth block of the plurality of growth block as a function of the classification of the system data to the one or more descriptors; and generating the complementary data set as a function of the selection.

15. The method of claim 10, wherein determining, by the at least a processor, the complementary data set comprises determining the complementary data set as a function of the system data and a complementary machine-learning model.

16. The method of claim 15, wherein determining, by the at least a processor, the complementary data set as a function of the system data and the complementary machine- learning model comprises:

receiving complementary training data, wherein the complementary training data comprises a plurality of system data inputs correlated to a plurality of complementary data set outputs;

training the complementary machine learning model as a function of the complementary training data;

selecting the complementary data set as a function of the complementary machine learning model; and classifying one or more advisor profiles to the complementary data set.

17. The method of claim 15, wherein classifying the one or more advisor profiles to the complementary data set further comprises classifying one or more advisor profiles as a function of the at least a geographical datum.

18. The method of claim 10, wherein:

receiving, by the at least a processor, the system data comprises:

encrypting the system data; and storing the system data on a database; and transmitting, by the at least a processor, the complementary data set to the at least a remote device comprises transmitting a decryption key to a second computing device.

19. The apparatus of claim 1, wherein the entity data further comprises one or more of an amount of equity owned by an entity, an amount of debt of the entity, an industry associated with the entity, manufacturing sites associated with the entity, at least a cost of an associated product of the entity, and a bill of materials for the entity.

20. The method of claim 10, wherein the entity data further comprises one or more of an amount of equity owned by an entity, an amount of debt of the entity, an industry associated with the entity, manufacturing sites associated with the entity, at least a cost of an associated product of the entity, and a bill of materials for the entity.

\* \* \* \* \*